US011416471B2

(12) United States Patent
Robbin et al.

(10) Patent No.: US 11,416,471 B2
(45) Date of Patent: *Aug. 16, 2022

(54) MANAGEMENT OF DOWNLOADS FROM A NETWORK-BASED DIGITAL DATA REPOSITORY BASED ON NETWORK PERFORMANCE

(71) Applicant: Apple Inc., Cupertino, CA (US)

(72) Inventors: Jeffrey L. Robbin, Los Altos, CA (US); Lucas C. Newman, San Francisco, CA (US); Scott J. Forstall, Mountain View, CA (US); Stephen O. Lemay, San Francisco, CA (US); Steve Saro Gedikian, Redwood City, CA (US); Max Muller, San Jose, CA (US); Thomas Alsina, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,277

(22) Filed: Feb. 19, 2018

(65) Prior Publication Data

US 2018/0293268 A1    Oct. 11, 2018
US 2022/0207112 A9    Jun. 30, 2022

Related U.S. Application Data

(63) Continuation of application No. 14/945,961, filed on Nov. 19, 2015, now Pat. No. 9,898,500, which is a
(Continued)

(51) Int. Cl.
*H04L 29/08*    (2006.01)
*H04L 12/26*    (2006.01)
(Continued)

(52) U.S. Cl.
CPC ........ *G06F 16/2365* (2019.01); *G06F 16/122* (2019.01); *G06F 16/182* (2019.01);
(Continued)

(58) Field of Classification Search
None
See application file for complete search history.

(56) References Cited

U.S. PATENT DOCUMENTS 6,075,862 A    6/2000    Yoshida et al.
6,076,111 A    6/2000    Chiu et al.
(Continued)

FOREIGN PATENT DOCUMENTS

AU    2012216253 A1    3/2013
AU    2012261814 B2    2/2016
(Continued)

OTHER PUBLICATIONS

International Search Report and Written Opinion from PCT Application No. PCT/US2012/040791 dated Oct. 2012, pp. 1-8.
(Continued)

*Primary Examiner* — Mohamed Ibrahim
(74) *Attorney, Agent, or Firm* — Fletcher Yoder, P.C.

(57) ABSTRACT

Improved techniques and systems for storage, delivery and acquisition of digital assets stored in cloud data storage. Cloud data storage can be provided by a cloud data repository that is capable of storing digital data for various users. A given user can access cloud data storage from any of his/her authorized client devices via a network. A given client device can access not only locally stored digital assets but also remotely stored digital assets from cloud data storage. In one embodiment, downloads of digital assets resident in cloud data storage to client devices can be managed in view of available network performance. As one example, digital assets of differing quality levels can be
(Continued)

downloaded in a manner dependent on network performance. As another example, locally stored digital assets of reduced quality can be upgraded (e.g., replaced) by higher quality versions in a manner dependent on network performance.

20 Claims, 14 Drawing Sheets

Related U.S. Application Data continuation of application No. 13/492,631, filed on Jun. 8, 2012, now Pat. No. 9,201,895, which is a continuation-in-part of application No. 13/488,290, filed on Jun. 4, 2012, now abandoned.

(60) Provisional application No. 61/525,180, filed on Aug. 18, 2011, provisional application No. 61/525,177, filed on Aug. 18, 2011, provisional application No. 61/493,321, filed on Jun. 3, 2011.

(51) Int. Cl.
| | | |
|---|---|---|
| G06F 16/23 | (2019.01) | |
| G06F 16/11 | (2019.01) | |
| G06F 16/182 | (2019.01) | |
| G06F 16/957 | (2019.01) | |
| H04W 4/60 | (2018.01) | |
| H04L 67/06 | (2022.01) | |
| H04L 67/5682 | (2022.01) | |
| H04L 67/289 | (2022.01) | |
| H04L 43/0876 | (2022.01) | |

(52) U.S. Cl.
CPC ........ *G06F 16/957* (2019.01); *H04L 43/0876* (2013.01); *H04L 67/06* (2013.01); *H04L 67/289* (2013.01); *H04L 67/2852* (2013.01); *H04W 4/60* (2018.02)

(56) References Cited

U.S. PATENT DOCUMENTS

| 7,082,469 | B2 | 7/2006 | Gold et al. |
|---|---|---|---|
| 7,426,537 | B2 | 9/2008 | Lee et al. |
| 8,065,166 | B2 | 11/2011 | Maresh et al. |
| 8,234,302 | B1 | 7/2012 | Goodwin et al. |
| 8,438,297 | B1 | 5/2013 | Chen et al. |
| 9,201,895 | B2 | 12/2015 | Robbin et al. |
| 2002/0069369 | A1 | 6/2002 | Tremain |
| 2002/0152364 | A1 | 10/2002 | Gunaseelan et al. |
| 2003/0005306 | A1 | 1/2003 | Hunt et al. |
| 2003/0067872 | A1* | 4/2003 | Harrell ............ H04L 29/06027 370/229 |
| 2004/0138948 | A1 | 7/2004 | Loomis |
| 2005/0063401 | A1 | 3/2005 | Kenner et al. |
| 2005/0108191 | A1 | 5/2005 | Iyengar et al. |
| 2005/0190732 | A1 | 9/2005 | Douglas et al. |
| 2005/0280557 | A1 | 12/2005 | Jha et al. |
| 2006/0026296 | A1 | 2/2006 | Nagaraj |
| 2006/0155633 | A1 | 7/2006 | Fellenstein et al. |
| 2006/0190410 | A1 | 8/2006 | Harper |
| 2006/0230331 | A1 | 10/2006 | Abanami et al. |
| 2007/0067349 | A1 | 3/2007 | Jhaveri et al. |
| 2007/0169105 | A1* | 7/2007 | Amberny ............... G06F 8/65 717/170 |
| 2008/0015888 | A1 | 1/2008 | Dang et al. |
| 2008/0091840 | A1 | 4/2008 | Guo et al. |
| 2008/0162486 | A1 | 7/2008 | Bells et al. |
| 2009/0030889 | A1 | 1/2009 | Chatow et al. |
| 2009/0048940 | A1 | 2/2009 | Hill et al. |
| 2009/0119458 | A1 | 5/2009 | de Vries et al. |
| 2009/0132543 | A1 | 5/2009 | Chatley et al. |
| 2009/0138975 | A1 | 5/2009 | Richardson |
| 2009/0285492 | A1 | 11/2009 | Ramanujapuram et al. |
| 2010/0030773 | A1 | 2/2010 | Patterson |
| 2010/0169369 | A1 | 7/2010 | Wang et al. |
| 2010/0185673 | A1* | 7/2010 | Toebes .................... G06F 21/10 707/780 |
| 2010/0188990 | A1 | 7/2010 | Raleigh |
| 2010/0268950 | A1 | 10/2010 | Qu et al. |
| 2010/0323615 | A1 | 12/2010 | Vock et al. |
| 2010/0325199 | A1* | 12/2010 | Park ............... G06F 17/30067 709/203 |
| 2010/0332401 | A1 | 12/2010 | Prahlad et al. |
| 2011/0016194 | A1 | 1/2011 | Von Haden et al. |
| 2011/0029417 | A1 | 2/2011 | Tijerino |
| 2011/0131618 | A1 | 6/2011 | Hasek |
| 2011/0162086 | A1 | 6/2011 | Rogel et al. |
| 2011/0191835 | A1 | 8/2011 | Hawkes et al. |
| 2011/0296305 | A1 | 12/2011 | Orr et al. |
| 2012/0009898 | A1 | 1/2012 | Coleman et al. |
| 2012/0079606 | A1* | 3/2012 | Evans .................... G06F 21/10 726/28 |
| 2012/0109997 | A1 | 5/2012 | Sparks et al. |
| 2012/0124177 | A1 | 5/2012 | Sparks |
| 2012/0166574 | A1 | 6/2012 | Harvell et al. |
| 2012/0310762 | A1 | 12/2012 | Robbin et al. |
| 2012/0311069 | A1 | 12/2012 | Robbin et al. |
| 2012/0311080 | A1 | 12/2012 | Alsina et al. |
| 2012/0311081 | A1 | 12/2012 | Robbin et al. |
| 2012/0323792 | A1 | 12/2012 | Peterson et al. |
| 2012/0323868 | A1 | 12/2012 | Robbin et al. |
| 2012/0323944 | A1 | 12/2012 | Robbin et al. |
| 2013/0085586 | A1 | 4/2013 | Parekh |
| 2013/0157637 | A1* | 6/2013 | Bos ..................... H04W 8/245 455/418 |
| 2013/0226876 | A1 | 8/2013 | Gati et al. |
| 2014/0041058 | A1 | 2/2014 | Rogel et al. |
| 2014/0189056 | A1* | 7/2014 | St. Clair ............. H04L 67/303 709/217 |
| 2014/0250091 | A1 | 9/2014 | Wu |
| 2014/0304377 | A1* | 10/2014 | Andersson ........ H04L 65/1083 709/219 |
| 2014/0351606 | A1 | 11/2014 | Demilo et al. |
| 2016/0140162 | A1 | 5/2016 | Robbin et al. |

FOREIGN PATENT DOCUMENTS

| CN | 1054126 A | 8/1991 |
|---|---|---|
| CN | 1264476 A | 8/2000 |
| CN | 1661557 A | 8/2005 |
| CN | 101034995 A | 9/2007 |
| CN | 101043651 A | 9/2007 |
| CN | 101243443 A | 8/2008 |
| CN | 101383847 A | 3/2009 |
| CN | 101770375 A | 7/2010 |
| CN | 102110000 A | 6/2011 |
| CN | 103200216 A | 7/2013 |
| CN | 103582885 A | 2/2014 |
| EP | 1233591 A2 | 8/2002 |
| EP | 2560344 A2 | 2/2013 |
| EP | 2715573 A1 | 4/2014 |
| GB | 2493840 A | 2/2013 |
| GB | 2513341 A | 10/2014 |
| JP | 2006-238011 A | 9/2006 |
| JP | 2008-262497 A | 10/2008 |
| JP | 5468651 B2 | 4/2014 |
| JP | 5837186 B2 | 12/2015 |
| KR | 10-2013-0020634 A | 2/2013 |
| KR | 10-1548448 B1 | 8/2015 |
| TW | 201319845 A | 5/2013 |
| WO | 02/10943 A1 | 2/2002 |
| WO | 2007/024380 A2 | 3/2007 |
| WO | 2012/167272 A1 | 12/2012 |

OTHER PUBLICATIONS

International Preliminary Report on Patentability from PCT Application No. PCT/US2012/040791 dated Dec. 19, 2013, pp. 1-6.

(56) References Cited

OTHER PUBLICATIONS

Chinese Notification of the First Office Action (English and Chinese) of CN201210395380.4; dated Jun. 24, 2015; (24 pgs.).
International Preliminary Report on Patentability (Chapter I) for corresponding International Application No. PCT/US2012/040791, dated Dec. 19, 2013, 6 pages.
PCT Notification of Transmittal Search Report and Written Opinion of the International Searching Authority, or the Declaration, for the PCT Int'. Appln. No. US2012/040791, dated Oct. 9, 2012, (8 pages).
Chinese Notification of the First Office Action of CN201810874002.1; dated Mar. 4, 2019; (9 pgs.).

\* cited by examiner

900

| NAME | DURATION |
|---|---|
| Digital Asset A | 1:05 |
| Digital Asset B | 2:11 |
| Digital Asset C | 60:23 |
| ☐ Keep Downloaded | |

| NAME | DURATION |
|---|---|
| Digital Asset A | 1:05 |
| Digital Asset B | 2:11 |
| Digital Asset C | 60:23 |
| ☒ Keep Downloaded | |

MANAGEMENT OF DOWNLOADS FROM A NETWORK-BASED DIGITAL DATA REPOSITORY BASED ON NETWORK PERFORMANCE

CROSS-REFERENCE TO OTHER APPLICATIONS

This application is a continuation of U.S. application Ser. No. 14/945,961, filed Nov. 19, 2015 entitled "Management Of Downloads From A Network-Based Digital Data Repository Based On Network Performance"; which is a continuation of U.S. patent application Ser. No. 13/492,631, filed Jun. 8, 2012, entitled MANAGEMENT OF DOWNLOADS FROM A NETWORK-BASED DIGITAL DATA REPOSITORY BASED ON NETWORK PERFORMANCE, which in turn is a continuation-in-part application of U.S. patent application Ser. No. 13/488,290, filed Jun. 4, 2012, entitled "MANAGEMENT OF DOWNLOADS FROM A NETWORK-BASED DIGITAL DATA REPOSITORY," which is herein incorporated by reference, and which claims priority to: (i) U.S. Provisional Patent Application No. 61/525,180, filed Aug. 18, 2011, entitled "MANAGEMENT OF DOWNLOADS FROM A NETWORKBASED DIGITAL DATA REPOSITORY," which is herein incorporated by reference; (ii) U.S. Provisional Patent Application No. 61/525,177, filed Aug. 18, 2011, entitled "MANAGEMENT OF NETWORK-BASED DIGITAL DATA REPOSITORY," which is herein incorporated by reference; and (iii) U.S. Provisional Patent Application No. 61/493,321, filed Jun. 3, 2011, entitled "MANAGEMENT OF NETWORK-BASED DIGITAL DATA REPOSITORY," which is herein incorporated by reference.

This application claims priority to U.S. Provisional Patent Application No. 61/525,180, filed Aug. 18, 2011, entitled "MANAGEMENT OF DOWNLOADS FROM A NETWORK-BASED DIGITAL DATA REPOSITORY," which is herein incorporated by reference.

This application also claims priority to U.S. Provisional Patent Application No. 61/525,177, filed Aug. 18, 2011, entitled "MANAGEMENT OF NETWORK-BASED DIGITAL DATA REPOSITORY," which is herein incorporated by reference.

BACKGROUND OF THE INVENTION

Online stores and online shopping have become increasing more popular in recent years. Desktop and laptop computers have been used to purchase various goods and services from online stores. An online store may allow customers, via a network connection to the Internet, to browse, search and purchase various different items from the online store. Purchased items can be delivered by mail or make available for pickup at a store or another location.

Recently, digital assets (e.g., musical songs, movies, computer application programs) have become available for purchase from online stores. Moreover, digital assets have become available for delivery directly to the device used to purchase them. As such, today, a digital asset can be purchased from an online store by way of an electronic device (e.g., a desktop computer) from a residence and immediately delivered to the electronic device used to acquire the digital asset. In other words, after purchasing a digital asset from an online store via an electronic device, the digital asset can be "downloaded" by the electronic device for subsequent use thereon.

However, more recently, the number and variety of electronic devices with the ability to access online stores have dramatically increased. Today, a person may own and/or operate several electronic devices with the ability to access online stores, including a desktop computer, a laptop computer, a pad or tablet computer (e.g., iPad™), a smartphone, a media player, a gaming device, a television, and so on. In addition, an ever increasing number and types of digital assets are becoming available at online stores for various electronic devices, including, media, books, application programs, etc. As a result, management of delivery of digital assets to electronic devices can pose difficulties for users, especially those maintaining collections of various digital assets on several distinct electronic devices.

SUMMARY

Improved techniques and systems for storage, delivery and acquisition of digital assets stored in cloud data storage are disclosed. Cloud data storage can be provided by a cloud data repository that is capable of storing digital data for various users. A given user can access cloud data storage from any of his/her authorized client devices via a network. A given client device can access not only locally stored digital assets but also remotely stored digital assets from cloud data storage. In one embodiment, downloads of digital assets resident in cloud data storage to client devices can be managed in view of available network performance. As one example, digital assets of differing quality levels can be downloaded in a manner dependent on network performance. As another example, locally stored digital assets of reduced quality can be upgraded (e.g., replaced) by higher quality versions in a manner dependent on network performance.

The techniques and systems are suitable and useful for storing, delivering and accessing digital assets (e.g., media assets) that have been acquired from online stores. The techniques and systems are also suitable and useful for storing, delivering and accessing digital assets that have been acquired from other than from online stores. Regardless, the digital assets become accessible from a network-based digital data repository (e.g., cloud data repository) via electronic devices (e.g., user devices) and thus usable by the electronic devices. The digital assets can include media assets and/or non-media assets.

One aspect of certain embodiments pertains to providing cloud data storage to participating client devices. Cloud data storage can be provided by a network-based repository that is capable of storing digital data for various users. As used herein, the network-based repository can be referred to as a remote data repository or a cloud data repository. The digital data being stored in the cloud data storage can be made available to respective users via a network, such as the Internet (or World Wide Web). Users can store in the cloud data storage various digital data, including digital assets that have been purchased online, digital assets acquired from other non-online means, and/or any other digital files of the user. Access to digital data via the cloud data storage can be restricted to authenticated users and to a limited number authorized devices (client device) per user. Hence, a given user can access the cloud data storage from any of his/her authorized client devices.

Another aspect of certain embodiments pertains to managing downloads of digital assets resident in cloud data storage to client devices. A given client device can access not only locally stored digital assets but also remotely stored digital assets from the cloud data storage. In other words, remotely stored digital assets can be accessed by client devices, such as for downloading to local storage or for playing of the stored digital assets. A graphical user interface can be provided at the client devices to indicate availability of the locally stored digital assets as well as the remotely stored digital assets from the cloud data storage. In one embodiment, the graphical user interface can provide an integrated display in which both the locally stored digital assets as well as the remotely stored digital assets are depicted. In one implementation, the graphical user interface could include indicia to indicate whether the digital assets are resident locally or resident remotely in the cloud data storage. If a user were to request to play a remote asset, the data therefore would need to be downloaded (unless previously cached). By caching certain digital assets (e.g., that have been previously downloaded), device performance can be improved because the digital assets, although not formally stored locally, is available locally from cache storage. Also, by caching certain digital assets, power savings (as well as bandwidth consumption savings) can result because re-transmission of such data need not be performed (which is particular advantageous on client devices that couple to cloud data storage via a wireless link). Additionally, by storing the cached digital assets in their encrypted form, the client device can also conserve power and resources that would otherwise be consumed if decrypted.

Another aspect of certain embodiments also pertains to providing cloud data storage to participating client devices. At a client device, digital assets can be obtained from cloud data storage and stored locally at the client device. The local storage of the digital assets at the client device can be stored in a purgable or non-purgable manner. Purgable denotes that the associated digital assets although stored locally at the client device are subject to removal if storage capacity needs to be freed-up for more "important" digital assets. Also, digital assets originally stored as purgable can become non-purgable.

Another aspect of certain embodiments also pertains to providing cloud data storage of digital assets with different quality levels. These digital assets can be made available to participating client devices. At a client device, digital assets can be obtain from cloud data storage and stored locally at a client device. However, dependent on determined criterion, the client device might initially obtain a low quality version of a desired digital asset. In such case, sometime later, the client device can obtain a high quality version of the desired digital asset. In effect, the low quality version has been upgraded to the high quality version, which are typically separate electronic files. This approach makes appropriate use of available network bandwidth and avoids extended wait times for users of client devices.

The invention can be implemented in numerous ways, including as a method, system, device, apparatus (including computer readable medium and graphical user interface). Several embodiments of the invention are discussed below.

As a method for accessing data to present a digital asset at an electronic device having a memory for data storage, one embodiment can, for example, include at least: identifying a digital asset that is to be presented by the electronic device; determining network performance available to the electronic device; determining a quality version of the digital asset to request from remote cloud storage based on the network performance; requesting the determined quality version of the digital asset from the remote cloud storage; receiving an electronic file at the electronic device from the remote cloud storage, the electronic file pertaining to the determined quality version of the digital asset that was requested; and storing the electronic file in the data storage at the electronic device.

As a method for accessing data to present a digital asset at an electronic device having a local memory for data storage, another embodiment can, for example, include at least: receiving an indication of a digital asset that is to be presented by the electronic device; determining whether a high quality version of the digital asset is unavailable locally from the local memory of the electronic device; determining whether network performance available to the electronic device is adequate for digital asset download; determining whether the high quality version of the digital asset is available from a cloud data repository; downloading the high quality version of the digital asset from the cloud data repository to the electronic device if the digital asset is available from the cloud data repository but unavailable from the local memory of the electronic device, provided that the network performance available to the electronic device is determined to be adequate for digital asset download; and storing the high quality version of the digital asset being downloaded to the local memory.

As a non-transitory computer readable medium including at least computer program code stored thereon for accessing data to present a digital asset at an electronic device having a memory for data storage, one embodiment can, for example, include at least: computer program code for identifying a digital asset that is to be presented by the electronic device; computer program code for determining network performance available to the electronic device; computer program code for determining a quality version of the digital asset to request from remote cloud storage based on the network performance; computer program code for requesting the determined quality version of the digital asset from the remote cloud storage; computer program code for receiving an electronic file at the electronic device from the remote cloud storage, the electronic file pertaining to the determined quality version of the digital asset that was requested; and computer program code for storing the electronic file in the data storage at the electronic device.

As a non-transitory computer readable medium including at least computer program code stored thereon for accessing data to present a digital asset at an electronic device having a local memory for data storage, one embodiment can, for example, include at least: computer program code for receiving an indication of a digital asset that is to be presented by the electronic device; computer program code for determining whether a high quality version of the digital asset is unavailable locally from the local memory of the electronic device; computer program code for determining whether network performance available to the electronic device is adequate for digital asset download; computer program code for determining whether the high quality version of the digital asset is available from a cloud data repository; computer program code for downloading the high quality version of the digital asset from the cloud data repository to the electronic device if the digital asset is available from the cloud data repository but unavailable from the local memory of the electronic device, provided that the network performance available to the electronic device is determined to be adequate for digital asset download; and computer program code for storing the high quality version of the digital asset being downloaded to the local memory.

As a method for upgrading a digital asset at an electronic device having a local memory for data storage, and being able to couple to a network, one embodiment can, for example, include at least: determining whether a low quality version of a digital asset that is stored in the local memory should be upgraded; determining whether network performance available to the electronic device is adequate for digital asset upgrade; requesting downloading a high quality version of the digital asset from a cloud server, provided that the network performance available to the electronic device is determined to be adequate for digital asset upgrade; receiving, at the electronic device via the network, the high quality version of the digital asset from the cloud server; and storing the high quality version of the digital asset being upgraded to the local memory.

As a non-transitory computer readable medium including at least computer program code stored thereon for upgrading a digital asset at an electronic device having a local memory for data storage, and being able to couple to a network, one embodiment can, for example, include at least: computer program code for determining whether a low quality version of a digital asset that is stored in the local memory should be upgraded; computer program code for determining whether network performance available to the electronic device is adequate for digital asset upgrade; computer program code for requesting downloading a high quality version of the digital asset from a cloud server, provided that the network performance available to the electronic device is determined to be adequate for digital asset upgrade; computer program code for receiving, at the electronic device via the network, the high quality version of the digital asset from the cloud server; and computer program code for storing the high quality version of the digital asset being upgraded to the local memory.

As a graphical user interface presented on a display device associated with an electronic device, one embodiment can, for example, include at least a list of a plurality of digital assets, and a user interface control. The user interface control enables a user selection to indicate whether the plurality of digital assets in the list are to be stored locally at the electronic device and retained locally at the electronic device.

Various aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 9A is an exemplary graphical user interface according to one embodiment.

FIG. 9B is an exemplary graphical user interface according to one embodiment.

DETAILED DESCRIPTION OF EMBODIMENTS OF THE INVENTION

Figure 1:
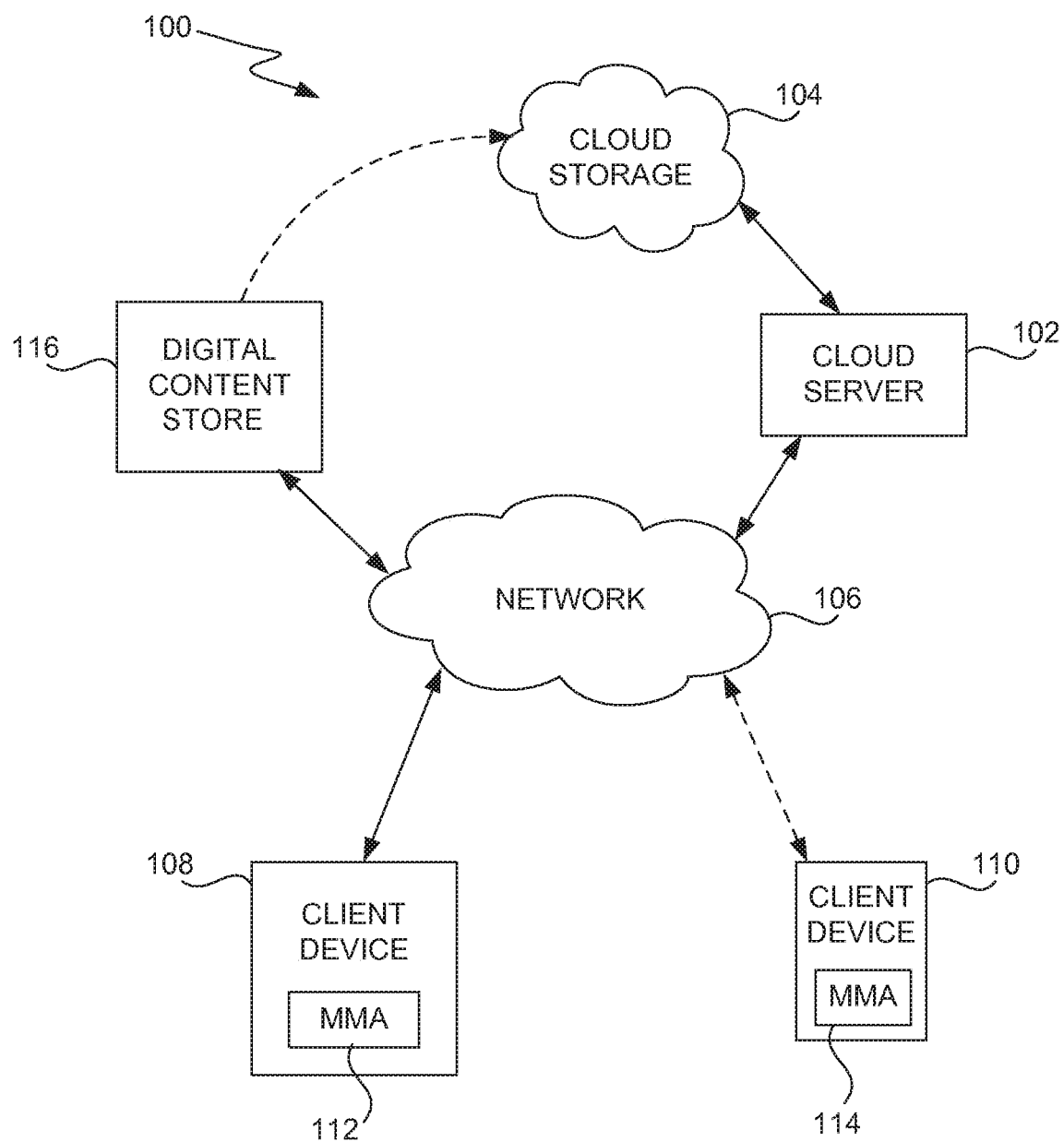
FIG. 1 is a block diagram of a network-based data management system according to one embodiment.

Improved techniques and systems for storage, delivery and acquisition of digital assets stored in cloud data storage are disclosed. Cloud data storage can be provided by a cloud data repository that is capable of storing digital data for various users. A given user can access cloud data storage from any of his/her authorized client devices via a network. A given client device can access not only locally stored digital assets but also remotely stored digital assets from cloud data storage. In one embodiment, downloads of digital assets resident in cloud data storage to client devices can be managed in view of available network performance. As one example, digital assets of differing quality levels can be downloaded in a manner dependent on network performance. As another example, locally stored digital assets of reduced quality can be upgraded (e.g., replaced) by higher quality versions in a manner dependent on network performance.

The techniques and systems are suitable and useful for storing, delivering and accessing digital assets (e.g., media assets) that have been acquired from online stores. The techniques and systems are also suitable and useful for storing, delivering and accessing digital assets that have been acquired from other than from online stores. Regardless, the digital assets become accessible from a network-based digital data repository (e.g., cloud data repository) via electronic devices (e.g., user devices) and thus usable by the electronic devices. The digital assets can include media assets and/or non-media assets.

One aspect of certain embodiments pertains to providing cloud data storage to participating client devices. Cloud data storage can be provided by a network-based repository that is capable of storing digital data for various users. As used herein, the network-based repository can be referred to as a remote data repository or a cloud data repository. The digital data being stored in the cloud data storage can be made available to respective users via a network, such as the Internet (or World Wide Web). Users can store in the cloud data storage various digital data, including digital assets that have been purchased online, digital assets acquired from other non-online means, and/or any other digital files of the user. Access to digital data via the cloud data storage can be restricted to authenticated users and to a limited number authorized devices (client device) per user. Hence, a given user can access the cloud data storage from any of his/her authorized client devices.

Another aspect of certain embodiments pertains to managing downloads of digital assets resident in cloud data storage to client devices. A given client device can access not only locally stored digital assets but also remotely stored digital assets from the cloud data storage. In other words, remotely stored digital assets can be accessed by client devices, such as for downloading to local storage or for playing of the stored digital assets. A graphical user interface can be provided at the client devices to indicate availability of the locally stored digital assets as well as the remotely stored digital assets from the cloud data storage. In one embodiment, the graphical user interface can provide an integrated display in which both the locally stored digital assets as well as the remotely stored digital assets are depicted. In one implementation, the graphical user interface could include indicia to indicate whether the digital assets are resident locally or resident remotely in the cloud data storage. If a user were to request to play a remote asset, the data therefore would need to be downloaded (unless previously cached). By caching certain digital assets (e.g., that have been previously downloaded), device performance can be improved because the digital assets, although not formally stored locally, is available locally from cache storage. Also, by caching certain digital assets, power savings (as well as bandwidth consumption savings) can result because re-transmission of such data need not be performed (which is particular advantageous on client devices that couple to cloud data storage via a wireless link.

FIG. 1 is a block diagram of a network-based data management system 100 according to one embodiment. The network-based data management system 100 provides data management for a plurality of different users. The various users can operate one or more client devices to access digital data being stored remotely by the network-based data management system 100. The network-based data management system 100 can also manage synchronization of data between multiple client devices associated with a particular user. Still further, the network-based data management system 100 can manage download of digital data from remote storage to client devices.

The network-based data management system 100 includes a cloud server 102. The cloud server 102 is coupled to cloud storage 104. The cloud storage 104 provides a large amount of digital data storage that is coupled to a network 106. The cloud storage 104 can store digital data for a large number of different users. Although the cloud storage 104 is shared amongst a large number of different users, the digital data being stored for a given user can be accessible only by the given user. The cloud server 102 can serve to manage storage, access and distribution of data to and from the data storage by the cloud storage 104. The cloud storage 104 can also facilitate synchronization of data for users making use of the cloud storage 104.

The cloud storage 104 is accessible by way of the cloud server 102 by client devices associated with users. For example, as illustrated in FIG. 1, client device 108 and client device 110 can be coupled to the network 106 so as to gain access to data stored in the cloud storage 104. The client devices 108 and 110 can represent electronic devices, such as computing devices. For example, the client device 108 can represent a computer, while the client device 110 can represent a mobile phone (e.g., smart phone). Typically, the client devices 108 and 110 include an application program (or utility or operating system program) that facilitates access to the cloud server 102 by way of the network 106. The network 106 can consist of one or more wired or wireless networks. The client device 108 can, for example, connect to the network 106 by a wired connection, and the client device 110 can, for example, connect to the network 106 by a wireless connection.

Additionally, the client device 108 can include an application program, such as a media management application 112, that facilitates access, presentation and utilization of data stored either locally at the client device 108 or remotely at the cloud storage 104. Similarly, the client device 110 can include an application program, such as a media management application 114, that facilitates access, presentation and utilization of data stored either locally at the client device 110 or remotely at the cloud storage 104.

Still further, the network-based data management system 100 can include a digital content store 116. The digital content store 116 can facilitate electronic commerce to purchase, rent or otherwise acquire digital content. For example, the digital content store 116 can pertain to a digital media store (or online store) that offers digital content, such as movies, songs, audio books, applications, and/or games for purchase, rental or utilization. Additionally, if a user of the client device 108 or 110 were to purchase a digital media item from the digital content store 116, the digital media item could be downloaded to the corresponding client device 108 or 110 as well as also provided to the cloud storage 104. Hence, the cloud storage 104 can store the purchased digital media item (at least a link to the stored content) such that any of the user's client devices authorized for usage can access the cloud storage 104 associated with the user to gain access to the purchased digital media item. In this way, the purchase digital media item is directly added to the cloud storage 104 and thus does not need to be uploaded from the purchasing client device. Also, any of the user's other client devices that are authorized can also access (including downloading and playing) the purchased digital media item from the cloud storage 104.

Figures 2A, 2B:
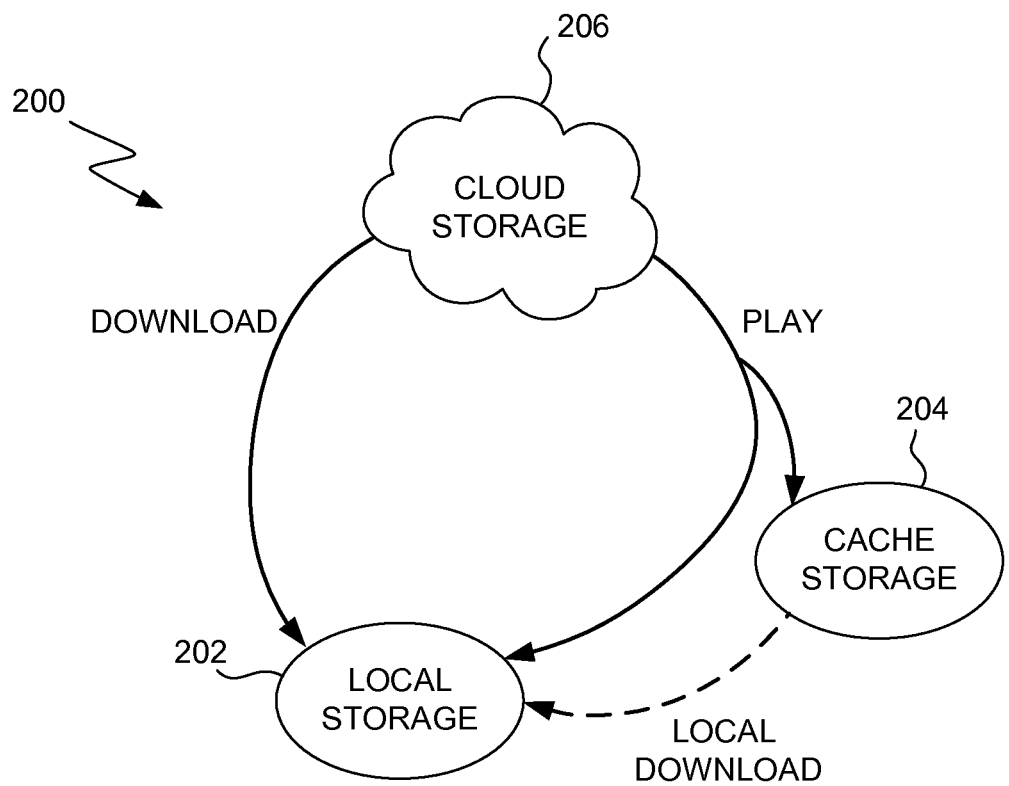
FIG. 2A is a state diagram of a hierarchical storage system for digital assets.
FIG. 2B is an exemplary graphical user interface according to one embodiment.

FIG. 2A is a state diagram of a hierarchical storage system 200 for digital assets. The hierarchical storage system 200 includes local storage 202, cache storage 204 and cloud storage 206. The local storage 202 is data storage provided on a client device, such as the client devices 108 and 110 illustrated in FIG. 1. The cache storage 204 is temporary data storage that is maintained in anticipation of future usage. Typically, the temporary data storage for the cache storage 204 is also provided on the client device. For example, a block of memory at the client device can be allocated as the cache storage 204 and managed to store data likely to be needed. The cloud storage 206 is provided remote from the client device but accessible through a computer network (e.g., the Internet). The cloud storage 206 can provide massive data storage for many distinct users, where each user can have its own isolated cloud storage.

To the extent that a digital asset is stored to the local storage 202, an application program operating on the client device can locally access and utilize the digital asset. For example, the digital assets could be read from the local storage 202 and played at the client device without any need for a network connection (wired or wireless).

However, a user might desire to access (e.g., play) a digital asset at the client device; however, the particular digital access is stored in the cloud storage 206 but not the local storage 202 or the cache storage 204. In this case, the digital asset can be transmitted from the cloud storage 206 to the local storage 202 is temporarily stored, such as for the duration of an access session. In effect, the transmission is perceptively like a streaming of the digital asset but the mechanism used is a downloading of its data file. For example, the data file can be downloaded and temporarily stored at the local storage 202 while being accessed (e.g., played). Here, network communications are used to download the whole data file which can be more power efficient than streaming. Since the client device is typically a mobile, battery-powered device, battery power consumption is an important consideration. Additionally, as the data file is downloaded, it can also be placed in the cache storage 204. The data file can remain in the cache storage 204 until replaced by some other data asset deemed more likely used. For example, a First-In-First-Out (FIFO) caching policy, popularity policy, most recently played policy, or other policy can be used.

According to another scenario, a user might desire to access (e.g., play) a digital asset at the client device; however, the particular digital asset is stored in the cloud storage 206 and the cache storage 204, but not the local storage 202. In this case, the digital asset need not be transmitted from the cloud storage 206 to the local storage 202 because the associated data file is already resident in the cache storage 204. Instead, the location of the data file in a memory device at the client device is determined. Conceptually, this can be referred to a local download. The data file can then be located in the memory device at the client device and used to play the digital asset.

FIG. 2B is an exemplary graphical user interface 250 according to one embodiment. The graphical user interface 250 includes a table 252 that includes a name (or title) column 254 and an attribute column 256. As illustrated in FIG. 2B, the attribute in the attribute column 256 pertains to duration. However, various attributes of digital assets can be additionally or alternatively presented in a similar fashion. The name column 254, or an additional column, can visually distinguish whether the corresponding digital assets are stored locally at the client device or remotely at the cloud storage. In the embodiment shown in FIG. 2B, a remote indicator 258 can be displayed to indicate that the corresponding digital asset is stored remotely at the cloud storage. Hence, in the table 252 shown in FIG. 2B, there are three digital assets listed, namely Digital Asset A, Digital Asset B and Digital Asset C. Of these three digital assets listed, the Digital Assets A and C are stored locally at the client device and the Digital Asset B is stored remotely at the cloud storage. A user can typically interact with the graphical user interface 250 to perform user actions, such as play, download, or delete any of the digital media assets.

More generally, a graphical user interface (such as graphical user interface 250) can be presented on a display device associated with an electronic device. In one embodiment, the graphical user interface can include a list of a plurality of digital assets and at least one visual indicator. As noted above, the list can, for example, be implemented as a table (e.g., table 252), and the visual indicator can, for example, be implemented by the remote indicator 258. Typically, of the plurality of digital assets (which can be associated with a particular user via a user account) at least one of the digital assets is stored locally at the electronic device, and at least one of the digital assets is stored remotely at a cloud data repository. The least one visual indicator can serve to distinguish for a user of the electronic device whether the digital assets are stored locally at the electronic device or remotely at the cloud data repository. The appearance and/or placement of the visual indicator can vary with implementation. For example, as shown in FIG. 2B, Digital Asset A and Digital Asset C are stored locally at the electronic device, while Digital Asset B is stored remotely at the cloud data repository. In an exemplary delete operation, If a user were to interact with the electronic device to delete Digital Asset A from the electronic device, digital Asset A would effectively no longer be stored locally but would still reside in the cloud data repository and this would be illustrated in the graphical user interface 250 as having the remote indicator 258.

In one implementation, a given one of the digital assets presented in the graphical user interface can be stored in one of at least three ways. In a first way, the given one of the digital assets is stored locally on the electronic device. In a second way, the given one of the digital assets is stored remotely at the cloud data repository (and not stored in the electronic device). In a third way, the given one of the digital assets is cached locally on the electronic device but formally resides at the cloud data repository. The visual indicator can serves to visually indicate whether the given one of the digital assets is stored in the first way or the second way. In this embodiment, the visual indicator does not visually distinguish the second way and the third way. As such, the user of the electronic device, is not made aware that a digital asset is cached at the electronic device. However, in another implementation, the visual indicator(s) could visually distinguish the second way from the third way so as to inform the user that the user whether the digital asset is cached at the electronic device.

Figure 3:
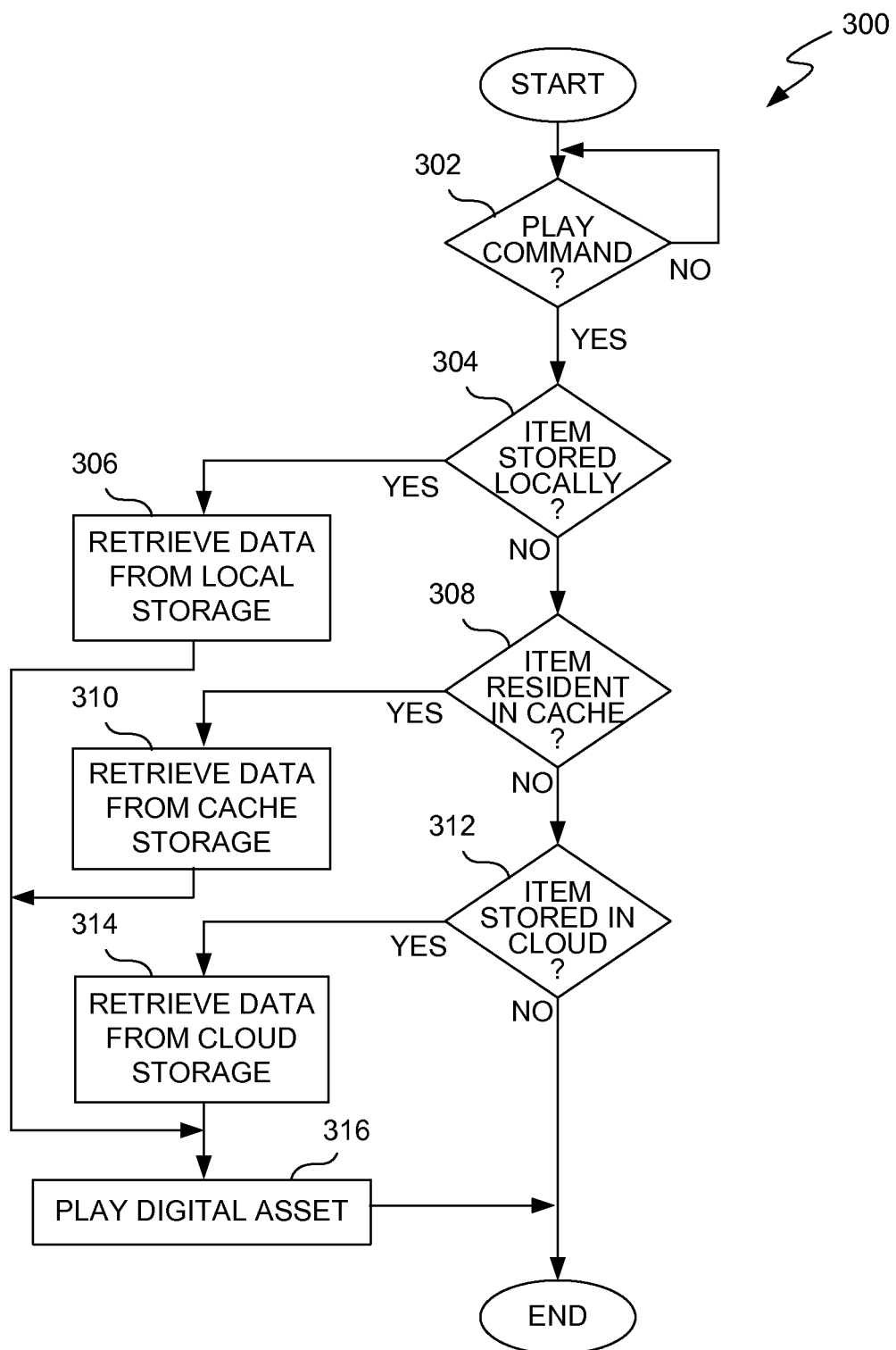
FIG. 3 is a flow diagram of a data retrieval and play process according to one embodiment.

FIG. 3 is a flow diagram of a data retrieval and play process 300 according to one embodiment. The data retrieval and play process 300 can, for example, be performed by a data playback device, such as a computing device, multi-function consumer electronic device (e.g., smart phone), or other client device.

The data retrieval and play process 300 can include a decision 302 that determines whether a play command has been initiated. In one implementation, a play command can be received from a user requesting that a digital asset be played by the data playback device. For example, FIG. 2B illustrates a graphical user interface 250 from which a play command for a particular digital asset can be initiated.

When the decision 302 determines that a play command has not been received, the data retrieval and play process 300 can await the receipt of a play command. On the other hand, when the decision 302 determines that a play command has been received, the data retrieval and play process 300 can continue. The play command identifies a digital asset (or item) that the user is requesting to be played by the data playback device.

Upon receiving the play command, a decision 304 can determine whether the item to be played is stored locally at the data playback device. When the decision 304 determines that the item to be played is stored locally, data for the item can be retrieved 306 from the local storage. For example, the data playback device typically includes an electronic memory to support the local storage which serves to store electronic data, such as digital data (e.g., content data) and metadata for the item to be played.

Alternatively, when the decision 304 determines that the item to be played is not stored locally, a decision 308 can determine whether the item to be played is resident in cache storage. The cache storage is typically also provided on the data playback device and provides temporary data storage (cache memory) for data that is likely to be again accessed at the data playback device. When the decision 308 determines that the item to be played is resident in cache storage, data for this item can be retrieved 310 from the cache storage provided by the data playback device. In this case, although the data for the item to be played was not formally resident in the local storage of the data playback device, the data for the item to be played was available from the cache storage.

Still further, when the decision 308 determines that the item to be played is not resident in the cache storage, a decision 312 can determine whether the item to be played is stored in cloud storage. When the decision 302 determines that the data for the item to be played is available from the cloud storage, data for this item can be retrieved 314 from the cloud storage.

Accordingly, the data for the item to be played can be retrieved from any of local storage, cache storage and cloud storage. After the data for the item to be played has been retrieved 306, 310 or 314, the item, namely, the digital asset, can be played 316. After the item has been played 316, the data retrieval and play process can 300 can end. In the event that, for some reason, the data for the item to be played is not available from any of local storage, cache storage and cloud storage, the data retrieval and play process 300 does not initiate playing of the item because the associated data is not available, in which case the data retrieval and play process 300 can also end, though the requestor could be informed that the play command has been unsuccessful.

Hence, the data retrieval and play process 300 can provide a hierarchical storage of data, using local, cache and cloud storage. Data can be retrieved from its most appropriate source. Hence, the data for digital assets is readily available and downloading is used to retrieve the data when such data is unavailable from local storage or cache storage. Consequently, device performance is improved and less electrical power is consumed. For example, when the data playback device is wirelessly coupled to network but the data is available in the local storage or cache storage, a wireless network interface (e.g., wireless transceiver) need not be powered to download the data, which provides a power savings and/or a reduction in bandwidth consumption.

Figure 4A:
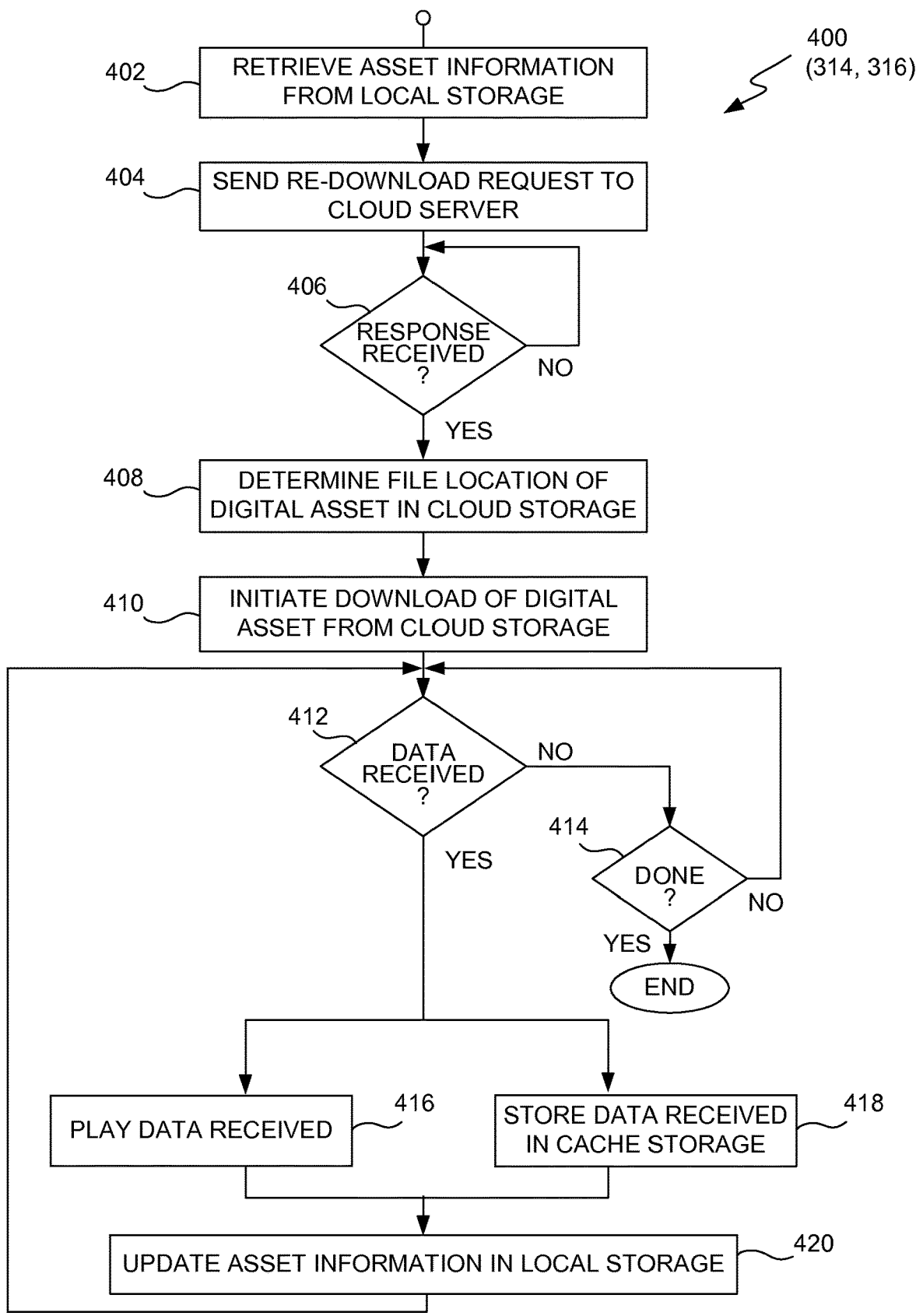
FIG. 4A is a flow diagram of a cloud data retrieval process according to one embodiment.

FIG. 4A is a flow diagram of a cloud data retrieval process 400 according to one embodiment. The cloud data retrieval process 400 can, for example, correspond to blocks 314 and 316 of FIG. 3, according to one embodiment. Here, the data for a digital asset (item) is to be retrieved from cloud storage.

The cloud data retrieval process 400 can retrieve 402 asset information for the item (digital asset) from the local storage. As noted above, the local storage can be data storage provided by the data playback device. For example, the local storage can be provided by semiconductor memory (e.g., FLASH memory) or a disc drive provided within the data playback device.

Next, a download request can be sent 404 to a cloud server. The cloud server serves to manage interaction with the cloud storage. After the download request has been sent 404 to the cloud server, a decision 406 can determine whether a response has been received. When the decision 406 determines that a response to the download request has not been received, the cloud data retrieval process 400 can await such a response.

Once the decision 406 determines that a response to the download request has been received, a file location of the digital asset in the cloud storage can be determined 408. Here, from the asset information provided in the response from the cloud server, the cloud data retrieval process 400 is able to determine 408 a file location for the digital asset in the cloud storage. In one embodiment, the asset information include location information, and the location information can include or be used to determine the file location for the digital asset in the cloud storage. Then, download of the digital asset from the cloud storage can be initiated 410. In one embodiment, the download of the digital asset from the cloud storage is initiated 410 by a request to retrieve the data file for the digital asset resident at the file location in the cloud storage. The download of the digital asset serves to copy the data file for the digital asset from the cloud storage to local storage.

Thereafter, a decision 412 can determine whether the data for the digital asset has been received. When the decision 412 determines that data for the digital asset has not been received, a decision 414 can determine whether the download of the digital asset is completed or should terminate (e.g., time out). When the decision 414 determines that the download of the digital asset is not complete and should not terminate, the cloud data retrieval process 400 returns to repeat the decision 412 so as to continue to receive or await receipt of the data file for the digital asset.

Once the decision 412 determines that data (i.e., at least a portion of the data file) for the digital asset has been received from the cloud storage, the data received can be played 416 at the data playback device. Concurrently, the data received can also be stored 418 in the cache storage. The cache storage is typically limited in the amount of storage and a policy can be used to manage the data stored in the cache storage. For example, the cache storage can use a FIFO policy or other policy so that its cached data remains useful. Although the data could physically be stored in two distinct locations at the data playback device, typically, the data would be physically stored once at the data playback device but further managed by an associated database to track status information for the digital asset. For example, the status information can include location, amount, state and/or type of storage being provided.

Following the blocks 416 and 418, asset information in the local storage can be updated 420. In one embodiment, the associated database resident in the data playback device (or elsewhere) can be updated 422 reflect the status of the data for the digital asset with respect to the data playback device. This status information can, for example, include the location of the data, the amount of data, the particular data received, the state of the data, and/or type of storage being provided. After the asset information in the local storage has been updated 420, the cloud data retrieval process 400 can return to repeat the block 412 and subsequent blocks so that subsequent data for the digital asset being downloaded can be continually received even while other portions of such data are being played 416 and stored 418. Eventually, the decision 414 determines that the download of the digital asset is complete (or otherwise should terminate), and then the cloud data retrieval process 400 can end.

Here, the digital assets, even though being obtained from cloud storage, are able to be played rather quickly once an initial portion of the data is received. However, it should be noted that if the data received is encrypted, decryption would be needed prior to playing 416 the data. Also, if the data received is encrypted, the storage of the received data to the cache storage can be stored as received, can be decrypted and stored unencrypted, or decrypted and re-encrypted prior to storage.

The storage 418 of the data to the cache storage typically stores the entire data file for the associated digital asset. Advantageously, then if the same digital assets were to be played again (e.g., replayed or repeated), then if still resident in the cache, the data is thus available without requiring downloading. As a result, not only is the play performance improved because the data is locally available but also the electronic device need not consume electrical power to download the data file (which is particularly advantageous with battery-powered electronic devices).

Additionally, when the data is available locally, network bandwidth is not consumed for download of the data.

In one embodiment, during download of a data file for a particular digital assets, a user might advance playback to a different portion of the digital asset (e.g., scrub operation). In such case, according to one embodiment, the downloading could also advance forward to obtain and play the data for the different portion. However, since the caching is concurrent with the downloading, the cached data can be incomplete (e.g., gaps in the cached data) in these types of situations. Hence, in one embodiment, a process (e.g., a utility or background process) can be used when network connectivity is available to download any missing portions of any of the digital assets resident in the cache storage.

Figure 4B:
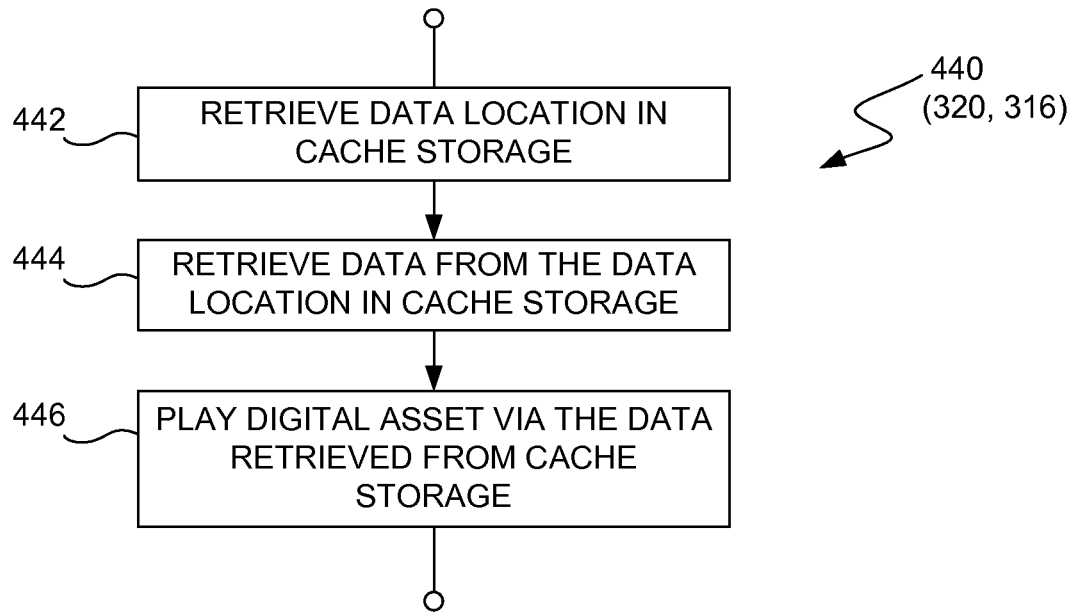
FIG. 4B is a flow diagram of cache data retrieval process according to one embodiment.

FIG. 4B is a flow diagram of cache data retrieval process 440 according to one embodiment. The cache data retrieval process 440 can, for example, represent one embodiment for the usage of the blocks 310 and 316 of the data retrieval and play process 300 illustrated in FIG. 3.

The cache data retrieval process 440 can initially retrieve 442 a data location in the cache storage for the digital asset that is to be played. The data playback device can include not only cache memory by also a database that contains location information for digital assets known to the data storage device. The location information includes or can be used to determine the data location. Once the data location in the cache storage has been retrieved 442, data can be retrieved 444 from the data location in the cache storage. Thereafter, the digital asset can be played 446 via the data retrieved from the cache storage. In this case, the data for the data asset is available locally such that the no download or streaming of its data is needed, which results in not only more responsive playback of the digital asset but also improved power efficiency since data transmission (e.g., wireless communications) is not needed for acquisition of the data.

Figure 4C:
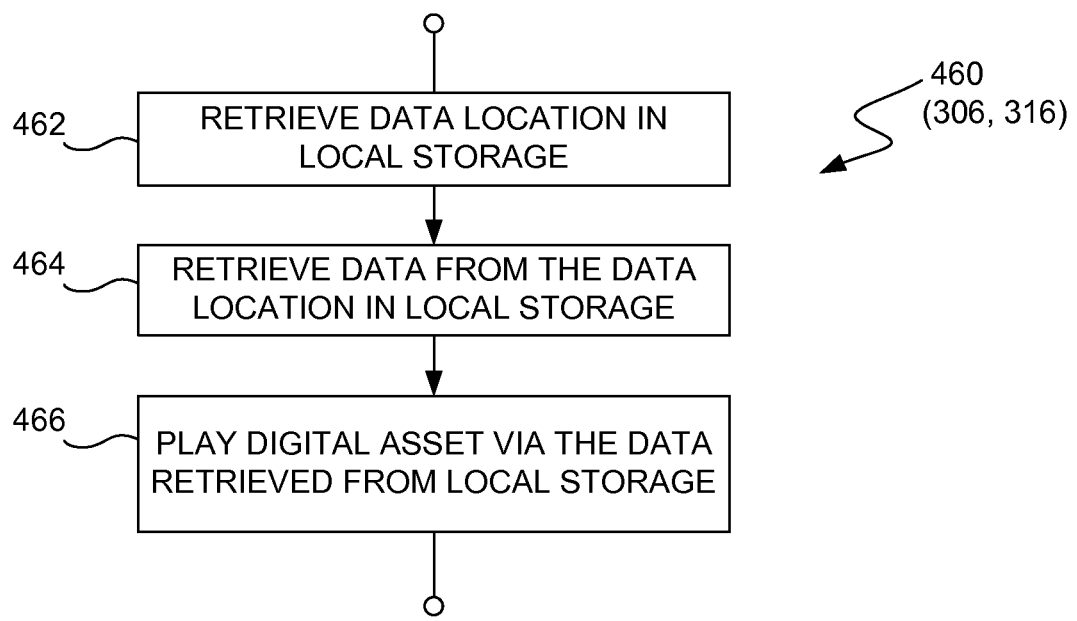
FIG. 4C is a flow diagram of local data retrieval process according to one embodiment.

FIG. 4C is a flow diagram of local data retrieval process 460 according to one embodiment. The local data retrieval process 460 can, for example, represent one embodiment for the usage of the blocks 306 and 316 of the data retrieval and play process 300 illustrated in FIG. 3.

The local data retrieval process 460 can initially retrieve 462 a data location in the local storage for the digital asset that is to be played. The data playback device can include not only local memory by also the database that contains location information for digital assets known to the data storage device. The location information includes or can be used to determine the data location. Once the data location in the local storage for the digital asset to be played has been retrieved 462, data can be retrieved 464 from the data location in the local storage. Thereafter, the digital asset can be played 466 via the data retrieved from the local storage. In this case, the data for the data asset is available locally such that no download or streaming of its data is needed, which results in power efficiency since data transmission (e.g., wireless communications) is not needed for acquisition of the data.

In the processing discussed above regarding FIGS. 3, 4A, 4B and 4C, it should be understood that an item or a digital asset is typically processed on the order of one or more data portions (e.g., chunks). For example, the download and/or storage of a digital asset can yield a complete electronic data file or can just yield one or more data portions. The availability of data for an item or media asset can be evaluated on a file basis or on a portion basis. For example, if certain portions are available locally, then those portions can be retrieved locally without download, while other portions that are not available locally can be downloaded.

Another aspect of certain embodiments also pertains to providing cloud data storage to participating client devices. At a client device, digital assets can be obtain from cloud data storage and stored locally at the client device. The local storage of the digital assets at the client device can be stored in a purgable or non-purgable manner. Purgable denotes that the associated digital assets although stored locally at the client device are subject to removal if storage capacity needs to be freed-up for more "important" digital assets. Purging can use a policy, such as digital assets that have been last downloaded or least recently played are purged first, to decide which digital assets to purge. The purging can also be limited, so that a minimum number of digital assets will always remain resident on the client device. For example, for a client device with 64 GB storage, the minimum number can be 1000 (which can be for audio assets—song tracks). As another example, a client device with 128 GB storage, the minimum number can be 2000. Also, digital assets originally stored as purgable can become non-purgable.

Figure 5A:
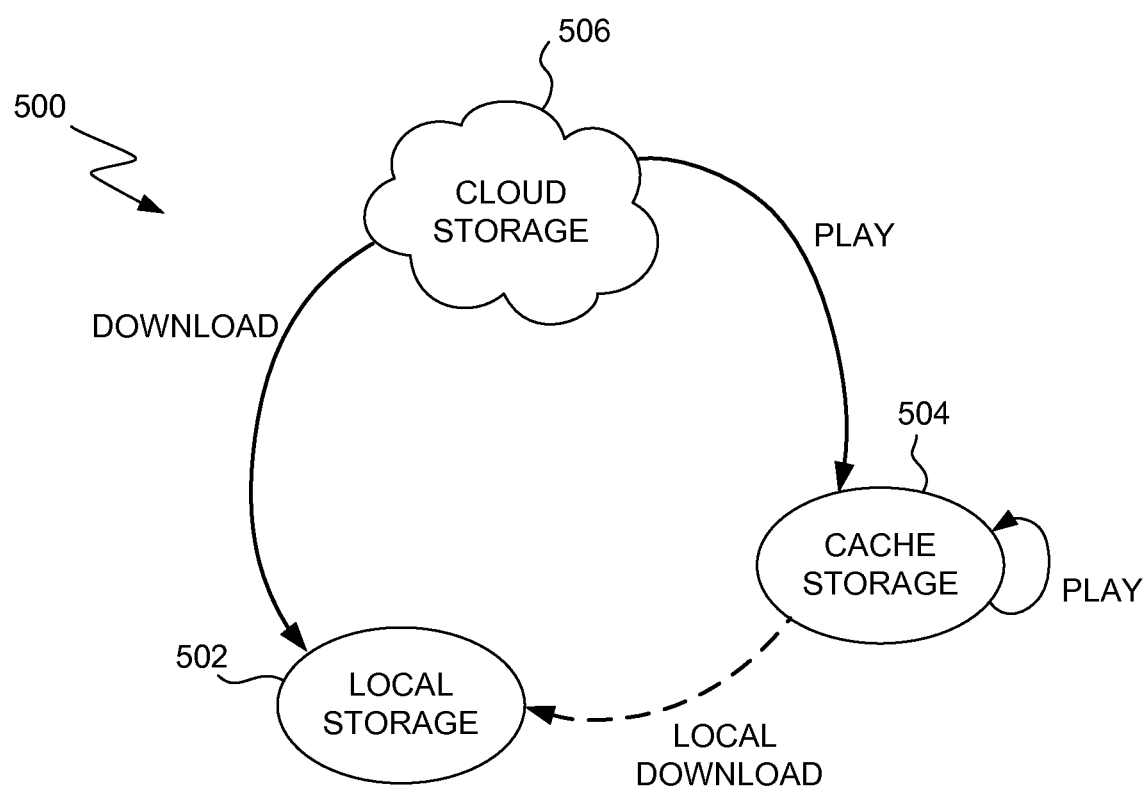
FIG. 5A is a state diagram of a hierarchical storage system for digital assets.

FIG. 5A is a state diagram of a hierarchical storage system 500 for digital assets. The hierarchical storage system 500 includes local storage 502, cache storage 504 and cloud storage 506. The local storage 502 is data storage provided on a client device, such as the client devices 108 and 110 illustrated in FIG. 1. The cache storage 504 is temporary data storage of data (e.g., data previously acquired from the cloud storage 506) that is maintained in anticipation of future usage. Typically, the temporary data storage for the cache storage 504 is also provided on the client device. For example, a block of memory at the client device can be allocated as the cache storage 504 and managed to store data previously acquired from the cloud storage 506 that is likely to be needed. The cloud storage 506 is provided remote from the client device but accessible through a computer network (e.g., the Internet). The cloud storage 506 can provide massive data storage for many distinct users, where each user can have its own isolated cloud storage.

To the extent that a digital asset is stored to the local storage 502, a computer program (e.g., application program) operating on the client device can locally access and utilize the digital asset. For example, the digital assets could be read from the local storage 502 and played at the client device without any need for a network connection (wired or wireless). In one embodiment, the digital assets stored in the local storage 502 are deemed "non-purgable", which allows a user of the client device to be confident that such digital assets will be resident on the client device unless otherwise remove by the user.

When a user of the client device desires to access (e.g., play) a digital asset at the client device, the client device can check whether or not the digital asset to be accessed is already resident in the local storage 502. When it is determined that the digital asset is already resident in the local storage 502, the digital asset can be located in memory for the local storage 502 at the client device and then locally access for playback of the digital asset.

On the other hand, when it is determined that the digital asset is not already resident in the local storage 502, the client device can check whether or not the digital asset to be accessed is available from the cache storage 504. When it is determined that the digital assets is resident in the cache storage 504, the digital asset can be located in memory for the cache storage 504 at the client device and used to play the digital asset.

Alternatively, when it is determined that the digital asset is not already resident in the local storage 502 or the cache storage 504, the client device can acquire the digital asset from the cloud storage 506. More particularly, if the digital asset to be accessed (e.g., played) is not available from the local storage 502 or the cache storage 504, then the digital asset can be transmitted from the cloud storage 506 to the cache storage 504 where it is stored but subject to being subsequently purged. In effect, the transmission is perceptively like a streaming of the digital asset but the mechanism used is a downloading of its data file. For example, the data file can be downloaded and temporarily stored at the cache storage 504 while being accessed (e.g., played). The data file stored to the cache storage 504 can be considered "purgable" because the data file can remain in the cache storage 504 until replaced by some other data asset deemed more likely used. For example, a First-In-First-Out (FIFO) caching policy, popularity policy, most recently played policy, or other policy can be used. The network communications can be used to download the whole data file which can be more power efficient than streaming. Since the client device is typically a mobile, battery-powered device, battery power consumption is an important consideration.

Besides seeking to access (e.g., play) the digital asset at the client device, the user could alternatively request to download the digital asset from the cloud storage 506. Here, a graphical user interface (GUI) can be presented at the client device to enable the user to request to download a particular digital asset (or group of digital assets). When the user request to download the digital asset, the digital asset can be retrieved from the cloud storage 506 and then transmitted from the cloud storage 506 to the local storage 502 where it is stored and not subject to being purged. However, before accessing the cloud storage 506 for the digital asset, it can be determined whether the cache storage 504 already stores the digital asset. If the cache storage 504 already has the digital asset stored therein, the digital asset need not be downloaded but can instead simply be moved from the cache storage 504 to the local storage 502, which are both on the client device. The movement (or reassignment) of the digital asset from the cache storage 504 to the local storage 502 can be referred to as a local download, though such does not involve a download action.

Additionally, it should be understood that a digital asset is provided as an electronic data file. The cloud storage 506 can provide a given digital asset in different quality levels. For example, the cloud storage 506 can store a given digital asset in a high quality format and a low quality format. In one implementation, the different quality formats can correspond to different bit rates. As one specific example, such the high quality format can correspond to 256 kb per second bit rate (i.e., high bit rate), while the low quality format can correspond to 64 kb per second bit rate (i.e., low bit rate).

The determination of which of the quality levels to utilize at the client device in response to a play request can be performed at the client device. In one embodiment, the client device evaluates its available network performance to determine which quality level should be transmitted (downloaded or streamed) from the cloud server to the client device. For example, the client device can evaluate its network performance which serves as an indication of the capacity of the network link between the client device and the cloud server supporting the cloud storage 506. When the network performance is low, such as a cellular connection (e.g., 3G network), then the client device can determine that it should request and receive the low quality format (e.g., 64 kb per second bit rate) for the digital asset that is available from the cloud storage 506, which would then be transmitted to the client device and stored in the cache storage 504. At this point, the cache storage 504 stores the low quality format for the digital asset. Alternatively, when the network performance is high, such as a local area network connection (e.g., Wi-Fi network), then the client device can determine that it should request and receive the high quality format (e.g., 256 kb per second bit rate) for the digital asset that is available from the cloud storage 506, which would then be transmitted to the client device and stored in the cache storage 504.

Also, if the digital asset being requested to be played is the low quality format that was already stored in the cache storage 504, then on a play request, the digital asset can be played at the client device by retrieving the data from the cache storage 504. However, if the data asset being requested to be played is the high quality format that is not already stored in the cache storage 504 (regardless of whether the low quality format is stored in the cache storage 504), the client device can request and receive the high quality format for the digital asset from the cloud storage 506 and then store the received electronic data file in the cache storage 504.

Still further, when the user requests to download the digital asset, the task is to deliver the high-quality format for the digital asset to the local storage 502. If the high-quality format for the digital asset happens to already be resident in the cache storage 504, the download can simply move (or reassign) the electronic data file from the cache storage 504 to the local storage 502, which can be referred to as a local download. However, if the cache storage 504 only stores the low quality version of the digital asset, then the client device requests download of the high-quality format of the digital asset from the cloud storage 506.

Figure 5B:
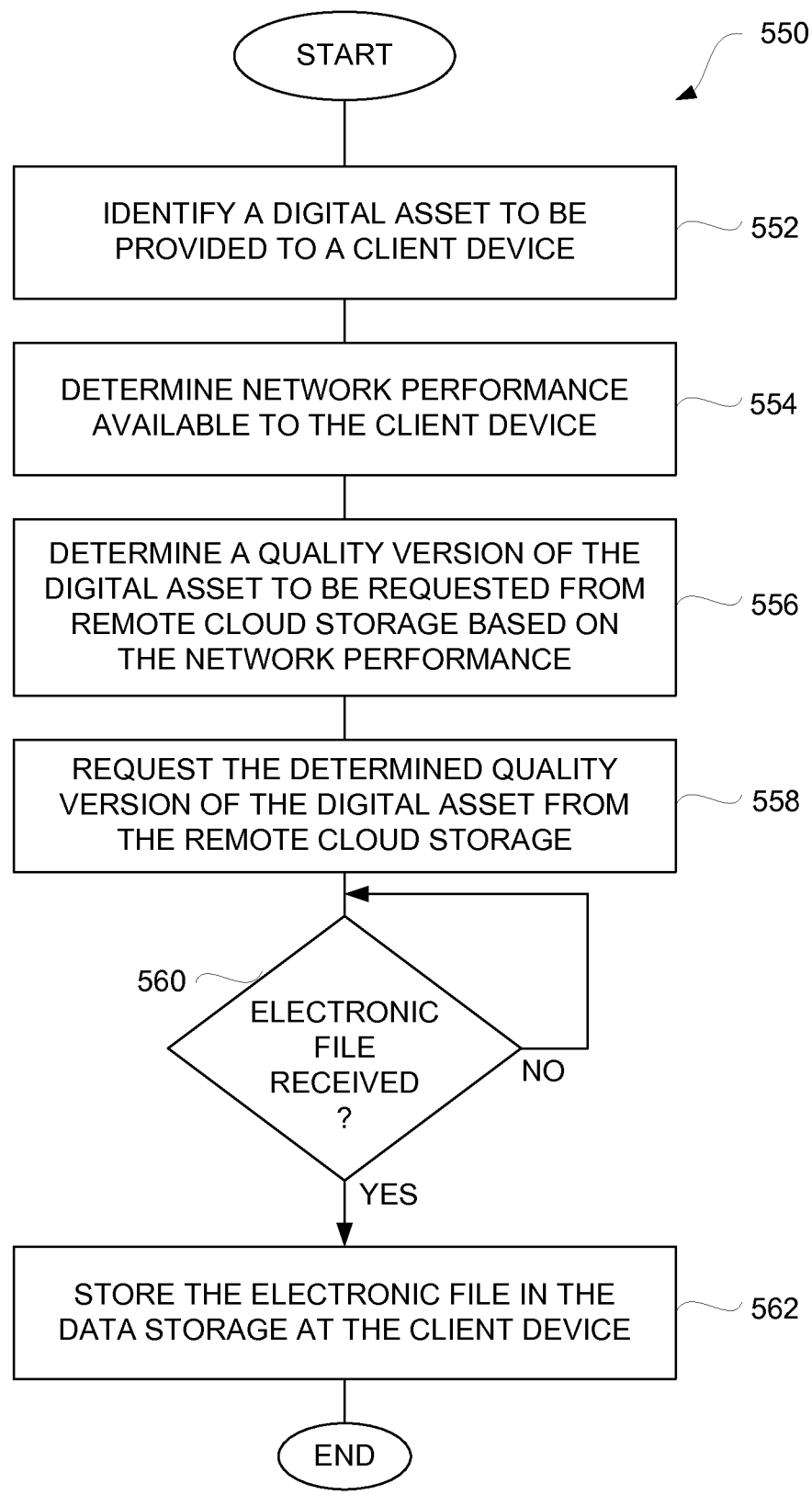
FIG. 5B is a flow diagram of a data retrieval and storage process according to one embodiment.

FIG. 5B is a flow diagram of a data retrieval and storage process 550 according to one embodiment. The data retrieval and storage process 550 can, for example, be performed by a client device. The client device can pertain to a computing device, a multi-function consumer electronic device (e.g., smart phone), or other electronic device. The client device is often a mobile electronic device, such as mobile phone, netbook, tablet computer, notebook computer, etc.

The data retrieval and storage process 550 can identify 552 a digital asset to be provided to the client device. In addition, network performance available to the electronic device can be determined 554. As an example, the network performance can be or determined from bandwidth or bit rate of a network (e.g., wireless network) being utilized by the client device to couple to the remote cloud storage. Next, a quality version of the digital asset to be requested from remote cloud storage is determined 556 based on the network performance. After the quality version of the digital asset has been determined 556, the determined quality version of the digital asset can be requested 558 from the remote cloud storage. A decision 560 can then determine whether an electronic file has received in response to the request for the determined quality version of the digital asset. When the decision 560 determines that an electronic file in response to the request is not yet been received, the data retrieval and storage process 550 can await such an electronic file (or a timeout event). On the other hand, when the decision 560 determines that an electronic file in response to the request has been received, the electronic file that has been received can be stored 562 in the data storage at the client device. Once the electronic file is stored 562 in the data storage at the client device, the electronic device is able to access and utilize (e.g., play) the electronic file, and thus the digital asset, locally from the data storage at the electronic device. Following the storage of the electronic file, the data retrieval and storage process 550 can end.

Figure 6A:
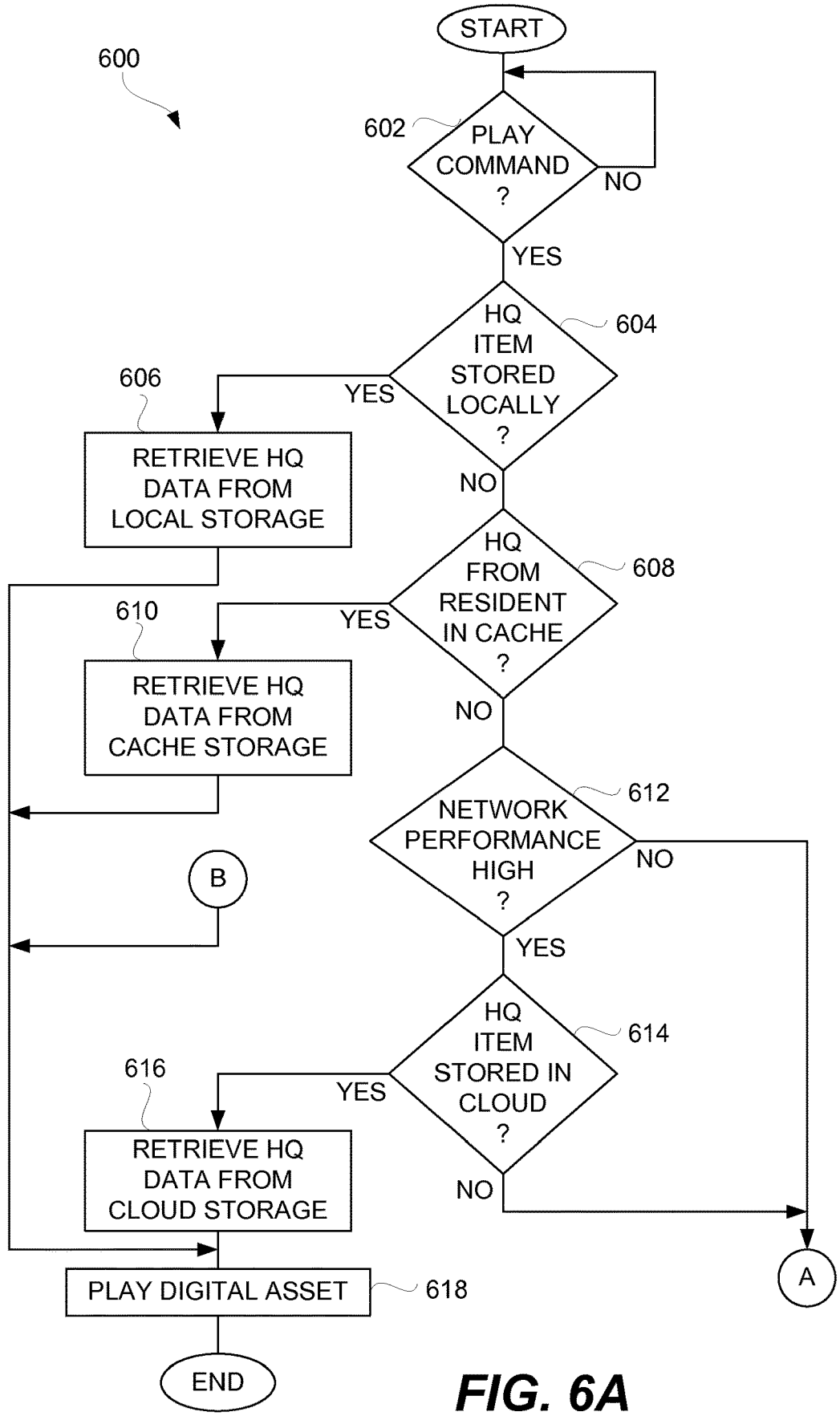
FIGS. 6A and 6B are a flow diagram of a data retrieval and play process according to one embodiment.
Figure 6B:
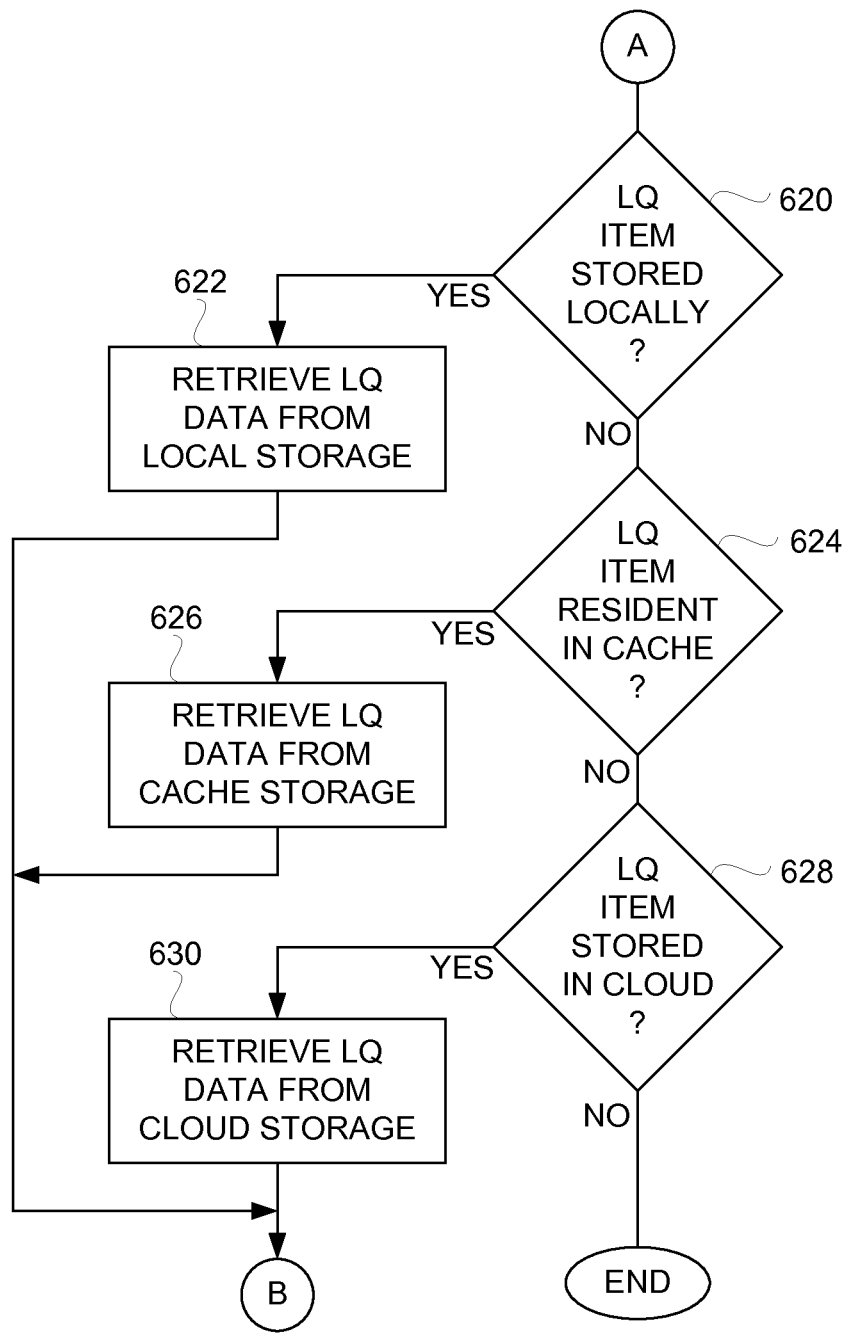

FIGS. 6A and 6B are a flow diagram of a data retrieval and play process 600 according to one embodiment. The data retrieval and play process 600 can, for example, be performed by a client device. The client device can pertain to a data playback device, such as a computing device, a multi-function consumer electronic device (e.g., smart phone), or other electronic device. The client device is often a mobile electronic device, such as mobile phone, netbook, tablet computer, notebook computer, etc.

The data retrieval and play process 600 can include a decision 602 that determines whether a play command has been initiated. In one implementation, a play command can be received from a user requesting that a digital asset be played by the data playback device. For example, FIG. 2B illustrates a graphical user interface 250 from which a play command for a particular digital asset can be initiated.

When the decision 602 determines that a play command has not been received, the data retrieval and play process 600 can await the receipt of a play command. On the other hand, when the decision 602 determines that a play command has been received, the data retrieval and play process 600 can continue. The play command identifies a digital asset (or item) that the user is requesting to be played by the data playback device.

Upon receiving the play command, a decision 604 can determine whether a high quality (HQ) version of the item to be played is stored locally at the data playback device. When the decision 604 determines that the HQ version of the item to be played is stored locally, data for the HQ version of the item can be retrieved 606 from the local storage (e.g., local storage 502). For example, the data playback device typically includes a non-volatile memory to support the local storage which serves to store electronic data, such as digital data (e.g., content data) and metadata for the item to be played.

Alternatively, when the decision 604 determines that the HQ version of the item to be played is not stored locally, a decision 608 can determine whether the HQ version of the item to be played is resident in cache storage (e.g., cache storage 504). The cache storage is typically also provided on the data playback device and provides temporary data storage (cache memory) for data that is likely to be again accessed at the data playback device. When the decision 608 determines that the HQ version of the item to be played is resident in cache storage, data for the HQ version of the item can be retrieved 610 from the cache storage provided on the data playback device. In this case, although the data for the item to be played was not formally resident in the local storage of the data playback device, the data for the item (of the appropriate quality level) to be played was available from the cache storage.

When the decision 608 determines that the HQ version of the item to be played is not resident in cache storage, a decision 612 can determine whether network performance is high. The client device can be coupled to one or more networks to access the cloud storage and/or other network resources or services. The network performance represents the ability of the one or more networks to transfer data from the cloud storage to the client device. For example, the client device is often a wireless device that relies on carrier networks to transfer data. Hence, given that the client device is typically a mobile device reliant on wireless networks and due to network congestion, the network bandwidth made available to the client device at any given point in time can vary. Hence, the network performance can represent an evaluation of the relatively near-term ability to transfer data over the network. For example, if the client device is presently able to connect to a local area network (e.g., Wi-Fi network), the network performance for data transfer can be considered high, since such networks have reasonably high network bandwidth. On the other hand, if the client device is presently not connected to the Internet by way of a local area network but only by a cellular network, the network performance for data transmission can be considered low.

When the decision 612 determines that the network performance is suitably high, a decision 614 can determine whether the HQ version of the item to be played is stored in cloud storage. When the decision 614 determines that the data for the HQ version of the item to be played is available from the cloud storage, data for the HQ version of the item can be retrieved 616 from the cloud storage.

Accordingly, the data for the HQ version of the item to be played can be retrieved from any of local storage, cache storage and cloud storage. After the data for the HQ version of the item to be played has been retrieved 606, 610 or 616, the HQ version of the item, namely, the digital asset, can be played 618. After the item has been played 618, the data retrieval and play process can 600 can end.

On the other hand, when the decision 612 determines that network performance is low, or when the decision 614 determines that the HQ version of the item to be played is not stored in the cloud storage, the data retrieval and play process 600 can perform blocks 620 through 630 shown in FIG. 6B. In particular, a decision 620 can determine whether the LQ version of the item to be played is stored locally at the data playback device. When the decision 304 determines that the LQ version of the item to be played is stored locally, data for the LQ version of the item can be retrieved 622 from the local storage (e.g., local storage 502).

Alternatively, when the decision 620 determines that the LQ version of the item to be played is not stored locally, a decision 624 can determine whether the LQ version of the item to be played is resident in cache storage (e.g., cache storage 504). The cache storage is typically also provided on the data playback device and provides temporary data storage (cache memory) for data that is likely to be again accessed at the data playback device. When the decision 624 determines that the LQ version of the item to be played is resident in cache storage, data for the LQ version of the item can be retrieved 626 from the cache storage provided on the data playback device. In this case, although the data for the item to be played was not formally resident in the local storage of the data playback device, the data (of the appropriate quality level) for the item to be played was available from the cache storage.

Still further, when the decision 624 determines that the LQ version of the item to be played is not resident in the cache storage, a decision 628 can determine whether the LQ version of the item to be played is stored in cloud storage. When the decision 628 determines that the data for the item to be played is available from the cloud storage, data for this item can be retrieved 630 from the cloud storage (if sufficient network bandwidth is available).

Accordingly, the data for the LQ version of the item to be played can be retrieved from any of local storage, cache storage and cloud storage. After the data for the LQ version of the item to be played has been retrieved 622, 626 or 630, the LQ version of the item, namely, the digital asset, can be played 618. After the item has been played 618, the data retrieval and play process 600 can end. In the event that, for some reason, the data for the LQ version of the item to be played is not available from any of local storage, cache storage and cloud storage, the data retrieval and play process 600 does not initiate playing of the item because the associated data is not available, in which case the data retrieval and play process 600 can also end, though the requestor could be informed that the play command has been unsuccessful.

Hence, the data retrieval and play process 600 can provide a hierarchical storage of data, using local, cache and cloud storage. Data can be retrieved from its most appropriate source. For a given digital asset, the data available from the one or more sources can have different quality levels (e.g., HQ or LQ versions). Hence, the data for digital assets is readily available and downloading is used to retrieve the data when such data is unavailable from local storage or cache storage. A lower quality version of the digital asset might be used if such data is not available locally and if network bandwidth is relatively low or intermittent. Consequently, device performance is improved and less electrical power is consumed. For example, when the data playback device is wirelessly coupled to network but the data is available in the local storage or cache storage, a wireless network interface (e.g., wireless transceiver) need not be powered to download the data, which provides a power savings and/or a reduction in bandwidth consumption.

Another aspect of certain embodiments also pertains to providing cloud data storage of digital assets with different quality levels. These digital assets can be made available to participating client devices. At a client device, digital assets can be obtain from cloud data storage and stored locally at a client device.

However, dependent on determined criterion (e.g., available network bit rate), the client device might initially obtain a low quality version of a desired digital asset. In such case, sometime later, the client device can obtain a high quality version of the desired digital asset. In effect, the low quality version has been upgraded to the high quality version, which are typically separate electronic files. This approach makes appropriate use of available network bandwidth and avoids extended wait times for users of client devices.

Figure 7:
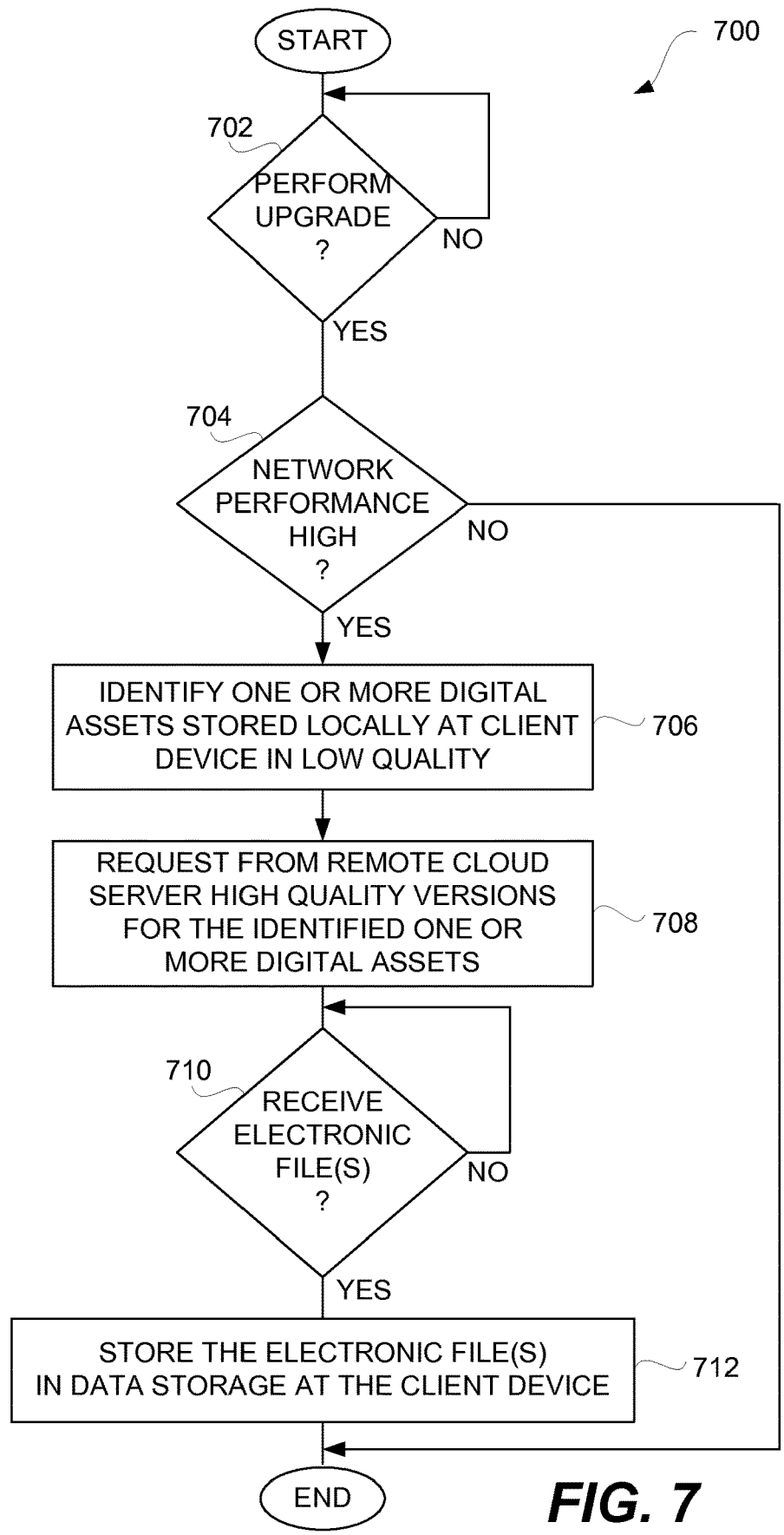
FIG. 7 illustrates a flow diagram of a quality upgrade process according to one embodiment.

FIG. 7 illustrates a flow diagram of a quality upgrade process 700 according to one embodiment. The quality upgrade process 700 can, for example, be performed by a client device. The client device can pertain to a computing device, a multi-function consumer electronic device (e.g., smart phone), or other electronic device. The client device is often a mobile electronic device, such as mobile phone, netbook, tablet computer, notebook computer, etc. that support wireless data transfer.

The quality upgrade process 700 can initially determined 702 whether an upgrade should be performed. Here, the client device typically already stores one or more low-quality versions of digital assets that are of interest to the user. The upgrade operation serves to upgrade these digital assets from their one or more low-quality versions to high-quality versions. Typically, the upgrade operation is initiated in an intelligent manner. For example, since high-quality versions require substantial bandwidth to be downloaded, the upgrade operation can be deferred until the client device is coupled to a high-speed network that provides the desired substantial bandwidth. As one specific example, the upgrade operation can be performed when the client device is coupled to a local area network (e.g., Wi-Fi network). Additional restrictions on the timing of the upgrade operation can include whether the client device is idle. In one implementation, the client device can be considered idle if it is in a locked mode, which means the user has not interacted with the phone for a predetermined period of time so a password entry is needed to unlock and use the device. Additional restrictions might include that the client device is coupled to a power supply (i.e., plugged into a wall outlet—AC powered) as opposed to being powered by a battery, since wireless data transfer can consume substantial amount of power. The additional restrictions could, however, be waived if a user is again seeking to access a particular digital asset previously stored as its low-quality version and has not yet be upgraded. In such a situation, the upgrade operation for at least the particular digital asset can be initiated if the client device is coupled to a local area network (and independent of additional restrictions).

In any event, when the decision 702 determines that upgrade operations should not performed, the quality upgrade process 700 awaits the proper time to perform upgrades. However, once the decision 702 determines that upgrade operations should be performed, the quality upgrade process 700 can continue. In which case, a decision 704 can determine whether network performance available to the client device is high. When the decision 704 determines that network performance is not high, the quality upgrade process 700 can end because is generally inefficient and otherwise problematic to attempt to upgrade using networks offering low performance to transfer substantial amount of data.

On the other hand, when the decision 704 determines that network performance available to the client device is sufficiently high (e.g., Wi-Fi network), one or more digital assets stored locally at the client device as the low-quality versions can be identified 706. These identified one or more digital assets represent the digital assets having low-quality versions that are to be upgraded at the client device. Next, high-quality versions for the identified one or more digital assets are requested 708 from remote cloud storage. A decision 710 can then determine whether one or more electronic files have been received in response to the request for the high-quality versions for the identified one or more digital assets. When the decision 710 determines that the one or more electronic files have not yet been received, the quality upgrade process 700 awaits such files (or timeout). However, once the decision 710 determines that one or more electronic files have been received from the remote cloud storage, the one or more electronic files can be stored 712 in data storage at the client device. Following the storage 712 of the one or more electronic files received from the remote cloud storage, the quality upgrade process 700 can end.

Figure 8A:
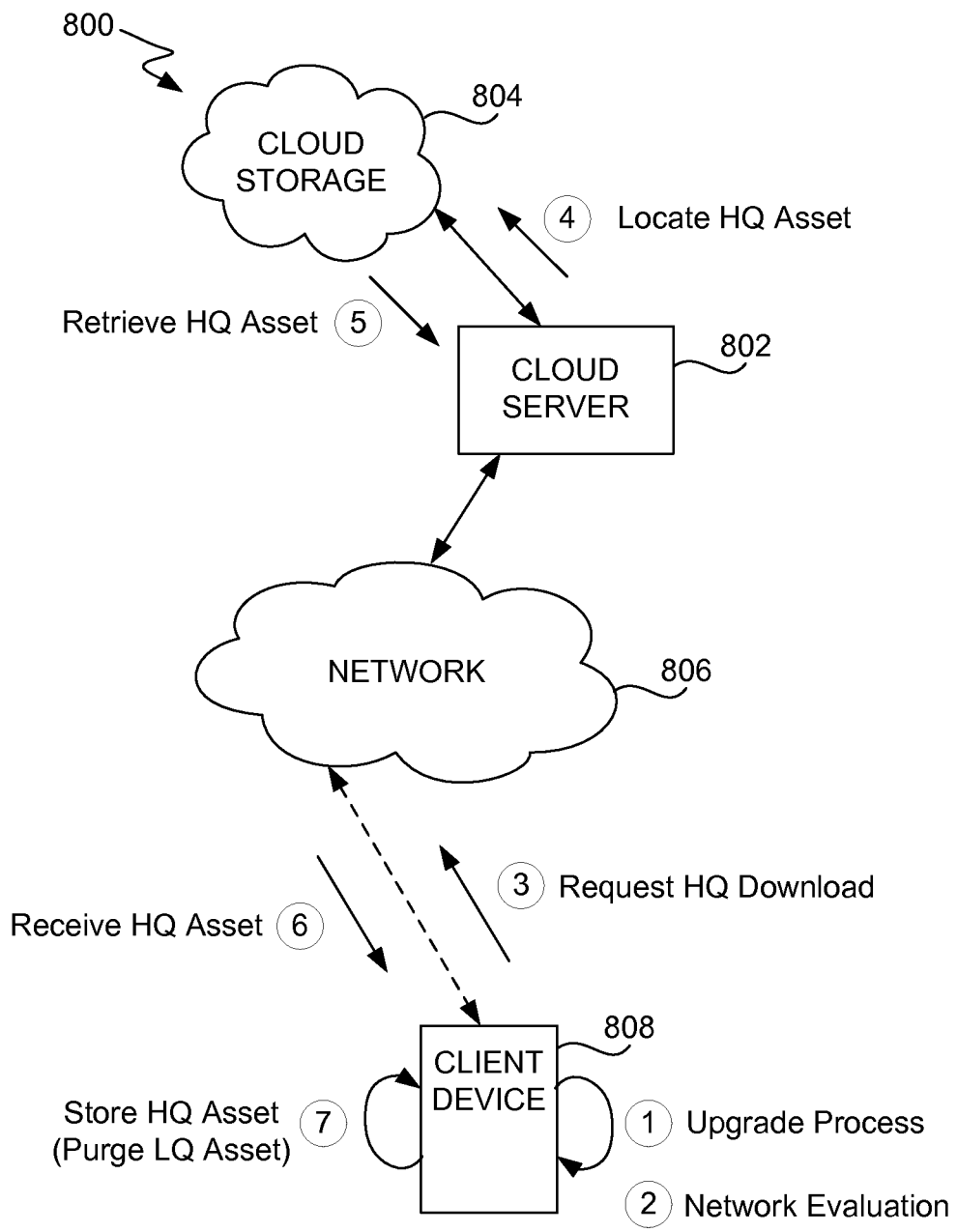
FIG. 8A is a block diagram of a network-based data upgrade system according to one embodiment.

FIG. 8A is a block diagram of a network-based data upgrade system 800 according to one embodiment. The network-based data upgrade system 800 can, for example, represent a portion of an implementation of the network-base data management system 100 illustrated in FIG. 1.

The network-based data upgrade system 800 includes a cloud server 802.

The cloud server 802 is coupled to cloud storage 804. The cloud storage 804 provides a large amount of digital data storage that is coupled to a network 806. The cloud storage 806 can store digital data for a large number of different users. Although the cloud storage 804 is shared amongst a large number of different users, the digital data being stored for a given user can be accessible only by the given user. The cloud server 802 can serve to manage storage, access and distribution of data to and from the data storage by the cloud storage 804.

The cloud storage 804 is accessible by way of the cloud server 802 by client devices associated with users. For example, as illustrated in FIG. 8, client device 808 can be coupled to the network 806 so as to gain access to data stored in the cloud storage 804. The client device 808 can represent an electronic device, such as a computing device. For example, the client device 808 can represent a personal computer or a mobile phone (e.g., smart phone). Typically, the client device 808 can include an application program (or utility or operating system program) that facilitates access to the cloud server 802 by way of the network 806. The network 806 can consist of one or more wired or wireless networks. The client device 808 can, for example, connect to the network 806 by a wired connection or by a wireless connection. However, the client device 108 is typically a mobile device which couples to the network by a wireless connection. Additionally, the client device 108 can include an application program, such as a media management application, that facilitates access, presentation and utilization of data stored either locally at the client device 808 or remotely at the cloud storage 804.

The network-based data upgrade system 800 illustrated in FIG. 8A also illustrates an idle upgrade operation of one or more digital assets. More particularly, the primary operations of the idle upgrade operation are depicted in FIG. 8A. The network-based data upgrade system 800 can perform a quality upgrade for one or more digital assets that are presently stored at the client device in a low-quality format. One embodiment of the idle upgrade operation can be described with reference to FIG. 8A as follows. At step (1), the client device 808 can determine whether the upgrade operation should be activated. As discussed above, the upgrade operation can be performed or initiated at the client device 808 when the client device 808 is idle. As an example, the client device can be deemed idle when it is in a low-power state or in a locked state. In any event, when at step (1) it is determined that the upgrade operation should be activated, the client device 808 can then evaluate network conditions, such as network performance, at step (2). Examples of network performance include network bandwidth or bit rate. If the network conditions are such that network performance is relatively low, the idle upgrade operation can end and be reconsidered at a later point in time. If the network conditions are such that network performance is relatively high, the idle upgrade operation can continue. When the idle upgrade operation continues, request for download of a high-quality (HQ) version of a particular digital asset is sent from the client device 808 to the cloud server 802, step (3). The cloud server 802, after receiving the request for the high-quality (HQ) version of the particular digital asset and after suitable authentication of the user and/or client device 808, locates the high-quality (HQ) version of the particular digital asset from the cloud storage 804, at step (4). The cloud server 802 then retrieves high-quality (HQ) version of the particular digital asset from the cloud storage 804, at step (5). Subsequently, the cloud server 802 can transmit data for the high-quality (HQ) version of the particular digital asset to the client device 808. The client device 808 then receives the transmitted data for the high-quality (HQ) version of the particular digital asset, at step (6). After receiving such transmitted data, the client device 808 can store at the client device 808 the received data for the high-quality (HQ) version of the particular digital asset, at step (7). Optionally, the low-quality (LQ) version of the particular digital asset previously stored on the client device 808 can be deleted (i.e., purged). Although the upgrade operation is discussed above with reference to upgrading a particular digital asset, the upgrade can be for or more digital assets, such as a set of digital assets, which can be upgraded individually or concurrently.

Figure 8B:
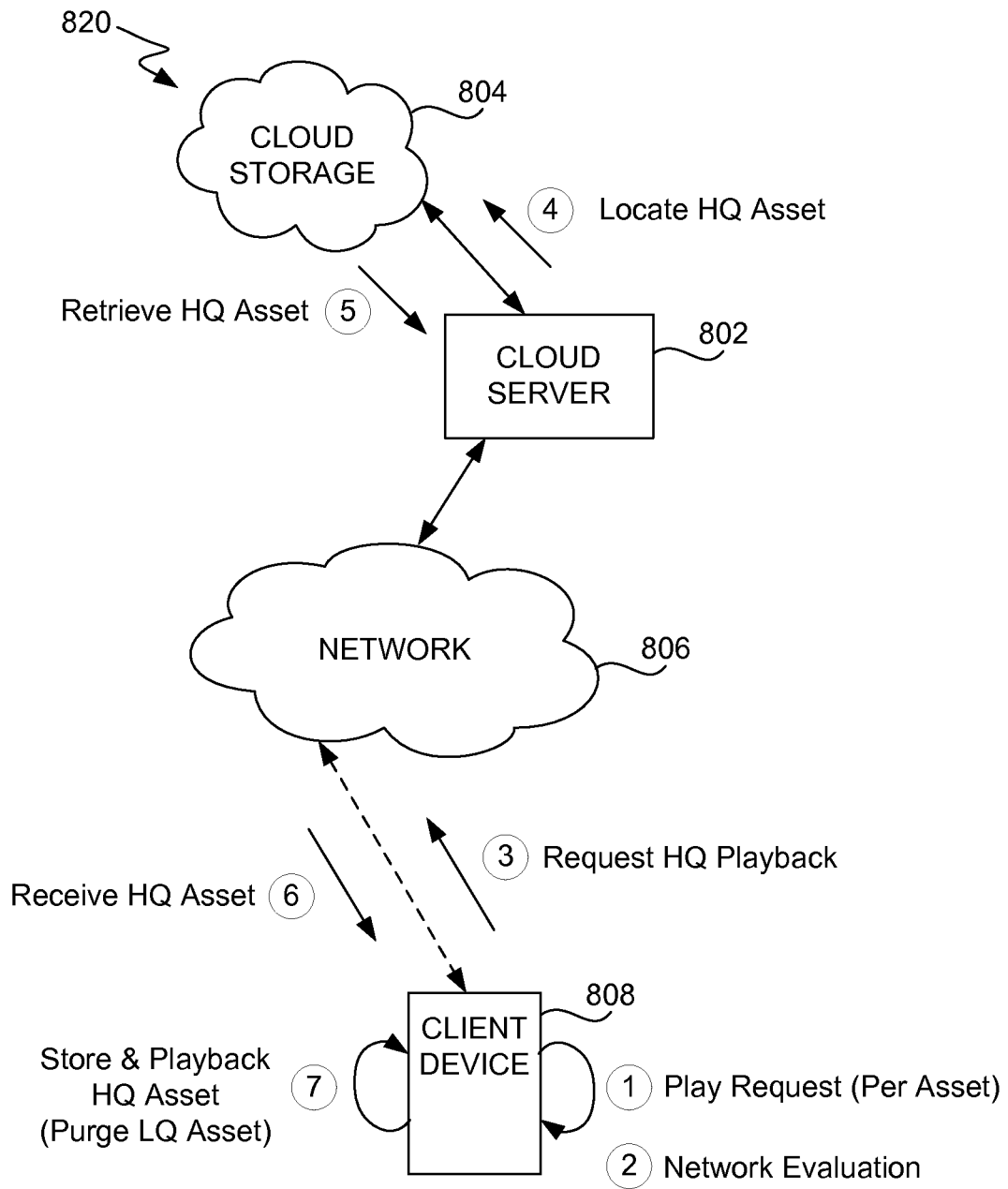
FIG. 8B is a block diagram of a network-based data upgrade system according to one embodiment.

FIG. 8B is a block diagram of a network-based data upgrade system 820 according to one embodiment. The network-based data upgrade system 820 can, for example, represent a portion of an implementation of the network-base data management system 100 illustrated in FIG. 1. The network-based data upgrade system 820 is generally structured the same as the network-based data upgrade system 800 illustrated in FIG. 8A. However, the network-based data upgrade system 820 illustrated in FIG. 8B illustrates a next play upgrade operation of one or more digital assets. The primary operations of the next play upgrade operation are depicted in FIG. 8B. The network-based data upgrade system 820 can perform a quality upgrade for one or more digital assets that are presently stored at the client device in a low-quality format. Specifically, when the client device (or its user) initiates playback of a digital asset previously stored at the client device 808 in low-quality format, the next play upgrade operation can be performed. One embodiment of the next play upgrade operation can be described with reference to FIG. 8B as follows. At step (1), the client device 808 can determine whether the upgrade operation should be activated. Here, the upgrade operation can be performed or initiated at the client device 808 when the client device (or its user) initiates playback of a digital asset previously stored at the client device in low-quality format. In any event, when at step (1) it is determined that the upgrade operation should be activated, the client device 808 can then evaluate network conditions, such as network performance, at step (2). Examples of network performance include network bandwidth or bit rate. If the network conditions are such that network performance is relatively low, the next play upgrade operation can end and be reconsidered at a later point in time. If the network conditions are such that network performance is relatively high, the next play upgrade operation can continue. When the next play upgrade operation continues, request for download of a high-quality (HQ) version of a particular digital asset is sent from the client device 808 to the cloud server 802, step (3). The cloud server 802, after receiving the request for the high-quality (HQ) version of the particular digital asset and after suitable authentication of the user and/or client device 808, locates the high-quality (HQ) version of the particular digital asset from the cloud storage 804, at step (4). The cloud server 802 then retrieves the high-quality (HQ) version of the particular digital asset from the cloud storage 804, at step (5). Subsequently, the cloud server 802 can transmit data for the high-quality (HQ) version of the particular digital asset to the client device 808. The client device 808 then receives the transmitted data for the high-quality (HQ) version of the particular digital asset, at step (6). After receiving such transmitted data, the client device 808 can store at the client device 808 the received data for the high-quality (HQ) version of the particular digital asset and can also initiate playback of the high-quality (HQ) version of the particular digital asset, at step (7). It should be noted that playback of the high-quality (HQ) version of the particular digital asset can be initiated once a portion of the associated data has been received. Optionally, the low-quality (LQ) version of the particular digital asset previously stored on the client device 808 can be deleted (i.e., purged). Although the upgrade operation is discussed above with reference to upgrading a particular digital asset, the upgrade can be for or more digital assets, such as a set of digital assets, which can be upgraded individually or concurrently.

The next play upgrade operation discussed above with respect to FIG. 8A operates to upgrade a low-quality version of a particular digital asset to a high-quality version of the particular digital asset. However, the upgrade is dependent upon the presence of suitable network conditions, such as adequate bandwidth. While the network evaluation can be done on a per digital asset basis, such as when initiating playback, the network evaluation could be performed more frequently, such as during the actual data transmission (download). For example, if the network evaluation when initiating playback indicated substantial network bandwidth, data transmission of the high-quality version of the digital asset would be started. However, if the network bandwidth were to substantially deteriorate midway through the transmission (or download) of the digital asset from the cloud storage 804 to the client device 808, then the next play upgrade might be aborted or paused. In such situations, the playing of the digital asset at the client device 808 may have already been started and, to preserve the playback, the client device 808 could switch to playing back of the low-quality version of the particular digital asset that is already resident on the client device 808. Subsequently, if network conditions again improve, the next play upgrade operation could be restarted and thus permit the client device 808 to switch back to playing the high-quality version of the particular digital asset.

Figure 8C:
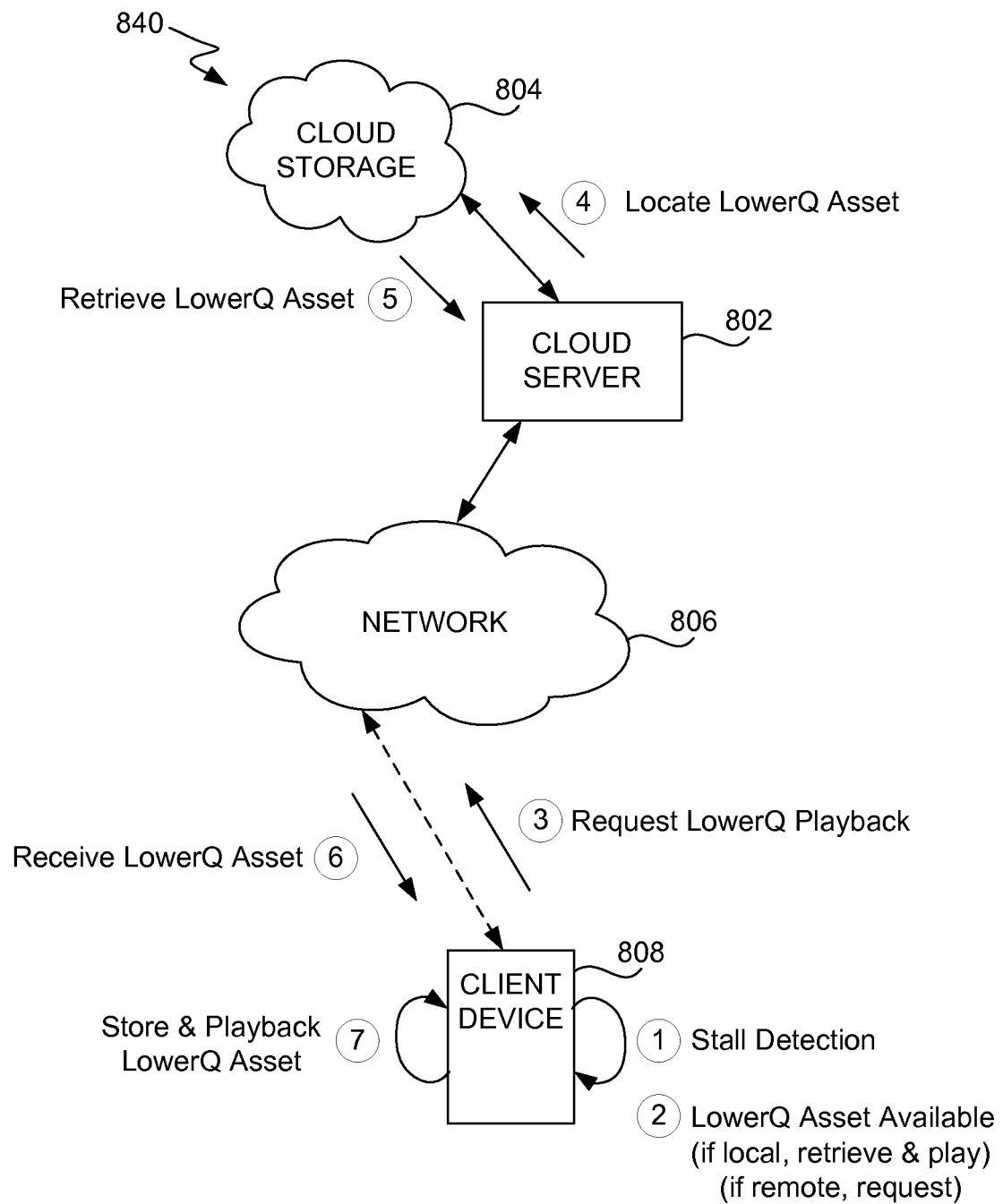
FIG. 8C is a block diagram of a network-based data downgrade system according to one embodiment.

FIG. 8C is a block diagram of a network-based data downgrade system 840 according to one embodiment. The network-based data downgrade system 840 can, for example, represent a portion of an implementation of the network-base data management system 100 illustrated in FIG. 1. The network-based data downgrade system 840 is generally structured the same as the network-based data upgrade system 800 illustrated in FIG. 8A. However, the network-based data downgrade system 840 illustrated in FIG. 8C illustrates a downgrade operation of one or more digital assets. The primary operations of the down upgrade operation are depicted in FIG. 8C. The network-based data downgrade system 840 can perform a quality downgrade for one or more digital assets that are presently being played back at the client device 808. Specifically, when the client device (or its user) initiates download of a high-quality (HQ) version of a digital asset from the cloud storage 804, the download can stall due to poor network conditions. In such cases, the network-based data downgrade system 840 can perform a downgrade operation to reduce disruption of the playback of the digital asset. One embodiment of the downgrade operation can be described with reference to FIG. 8C as follows. At step (1), the client device 808 can determine whether the downgrade operation should be activated. Here, the downgrade operation can be performed or initiated at the client device 808 when download of a digital asset being concurrently played has stalled, such as due to poor network performance. Also, the downgrade operation could be performed or initiated earlier such as when a stall is impending, such as when the amount of buffered audio is being depleted. Next, the downgrade operation can determine whether a lower quality version of the digital asset is available either locally or remotely. If a lower quality version of the digital assets is available locally (i.e., already stored on the client device 808), then the lower quality version of the digital asset can be locally retrieved and played. Here, the earlier download of the digital asset that has stalled can be aborted and instead playback resumed using the lower quality version of the digital asset. Alternatively, if a lower quality version of the digital asset is not available locally, the downgrade operation requests download of a lower quality (LowerQ) version of a particular digital asset is sent from the client device 808 to the cloud server 802, step (3). For example, the stalled download may be for a high-quality version, while the lower quality version (LowerQ) may be for a low-quality version or an intermediate-quality version. The cloud server 802, after receiving the request for the lower quality (LowerQ) version of the particular digital asset and after suitable authentication of the user and/or client device 808, locates the lower quality (LowerQ) version of the particular digital asset from the cloud storage 804, at step (4). The cloud server 802 then retrieves the lower quality (LowerQ) version of the particular digital asset from the cloud storage 804, at step (5). Subsequently, the cloud server 802 can transmit data for the lower quality (LowerQ) version of the particular digital asset to the client device 808. The client device 808 then receives the transmitted data for the lower quality (LowerQ) version of the particular digital asset, at step (6). After receiving such transmitted data, the client device 808 can store at the client device 808 the received data for the lower quality (LowerQ) version of the particular digital asset and can also initiate playback of the lower quality (LowerQ) version of the particular digital asset, at step (7). It should be noted that playback of the lower quality (LowerQ) version of the particular digital asset can be initiated once a portion of the associated data has been received. Although the downgrade operation is discussed above with reference to upgrading a particular digital asset, the downgrade can be for or more digital assets, such as a set of digital assets, which can be downgraded individually or concurrently.

As discussed above with respect to FIG. 8C, download and playback of a digital asset can be performed concurrently and, on stalling of the download, playback of the digital asset can continue or resume using a lower quality version of the digital asset. It should be understood that the downgrade operation can also influence playback of a subsequent digital asset. That is, if network performance has proven to be deficient with respect to downloading a first digital asset, when subsequently downloading a second digital asset following the download first digital asset, the download can adapt to initially retrieve a lower quality version of the second digital asset.

Another aspect of certain embodiment pertains to a graphical user interface (GUI) that enables a user to control local storage behavior for a client device. Through a user interface control associated with one or a group (set) of digital assets, a user can render the one or the group of digital assets locally resident and not subject to being automatically purged to make room for storage of other digital assets.

FIG. 9A is an exemplary graphical user interface 900 according to one embodiment. The graphical user interface 900 includes a list 902 (e.g., table) that includes a name (or title) column 904 and an attribute column 906. As illustrated in FIG. 9A, the attribute in the attribute column 906 pertains to duration. However, various attributes of digital assets can be additionally or alternatively presented in a similar fashion. The name column 904, or an additional column, can visually distinguish whether the corresponding digital assets are stored locally at the client device or remotely at the cloud storage. In the embodiment shown in FIG. 9A, a remote indicator 908 (e.g., cloud glyph) can be displayed to indicate that the corresponding digital asset is stored remotely at the cloud storage. Hence, in the list 902 shown in FIG. 9A, there are three digital assets listed, namely Digital Asset A, Digital Asset B and Digital Asset C. Of these three digital assets listed, the Digital Assets A and C are stored locally at the client device and the Digital Asset B is stored remotely at the cloud storage. The graphical user interface 900 can also include a "keep downloaded" control 910 that can be selected or unselected by a user. If the "keep downloaded" control 910 is unselected, as in FIG. 9A, then it has no effect on the digital assets in the list 902. A user can also typically interact with the graphical user interface 900 to perform user actions, such as play, download, or delete any of the digital media assets. The appearance and/or placement of the "keep downloaded" control 910 can vary with implementation. Also, in an alternative embodiment, the attribute column 906 can be not present or hidden.

FIG. 9B is an exemplary graphical user interface 900' according to one embodiment. The graphical user interface 900' represents the graphical user interface 900 after the "keep downloaded" control 910 has been selected. Namely, when the "keep downloaded" control 910 is selected, then the one or more digital assets in the list 902 are caused to be stored locally and remain stored locally. For example, following the selection of the "keep downloaded" control 910, the Digital Asset B would be downloaded to the client device presenting the graphical user interface 900. Additionally, the three digital assets in the list 902 would also remain stored in the client device and not be subjected to being purged from storage at the client device.

In view of the foregoing, it will readily be known that an electronic device provided in accordance with one or more embodiments can, for example, be a computing device (e.g., personal computer), mobile phone (e.g., cellular phone, smart phone), personal digital assistant (PDA), media player (e.g., music, videos, games, images), media storage device, camera, and/or the like. An electronic device may also be a multi-functional device that combines two or more of these device functionalities into a single device. A portable electronic device may support various types of network communications.

A portable electronic device can be provided as a hand-held electronic device. The term hand-held can generally refer to an electronic device with a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

Digital assets can be digital media assets. Digital media assets (e.g., digital media items) can, for example pertain to video items (e.g., video files or movies), audio items (e.g., audio files or audio tracks, such as for songs, musical albums, podcasts or audiobooks), or image items (e.g., photos). The digital media assets can also include or be supplemented by text or multimedia files.

Additional information on digital asset delivery is provided in: (i) U.S. patent application Ser. No. 13/171,253, filed Jun. 28, 2011, entitled "INTELLIGENT DELIVERY AND ACQUISITION OF DIGITAL ASSETS," which is herein incorporated by reference; and (ii) U.S. patent application Ser. No. 11/849,711, filed Sep. 4, 2007, and entitled "DIGITAL ASSET DELIVERY TO DIFFERENT DEVICES," which is hereby incorporated herein by reference, and its corresponding US Patent Publication 2009/0063301 A1 is also hereby incorporated herein by reference.

The various aspects, features, embodiments or implementations of the invention described above can be used alone or in various combinations.

The invention is preferably implemented by software, hardware, or a combination of hardware and software. The invention can also be embodied as computer readable code on a computer readable medium. The computer readable medium, which is non-transitory, is any data storage device that can store data which can thereafter be read by a computer system. Examples of the computer readable medium generally include read-only memory and random-access memory. More specific examples of computer readable medium are tangible (and non-transitory) and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of various embodiments of the invention are numerous. Different aspects, embodiments or implementations may, but need not, yield one or more of the following advantages. One advantage of at least some embodiments is that digital assets can be access from a common interface and provided to users in an efficient manner. Another advantage of at least some embodiments is that if digital assets are located remotely, when needed, they are download and not streamed for more efficient operation, including improved power efficiency. Still another advantage of at least some embodiments is that those remotely located assets that have been downloaded for playback can be cached for potential subsequent use.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for upgrading a digital asset at an electronic device having a memory for data storage, the method comprising:
   identifying, by the electronic device, a low quality version of the digital asset that is locally stored in local storage;
   determining, by the electronic device, network performance available to the electronic device, wherein the network performance is based at least in part upon a network congestion of a network communicatively used by the electronic device;
   determining, by the electronic device, whether the electronic device is being powered by a battery of the electronic device or an external power source;
   determining, by the electronic device, whether an upgrade of the locally stored digital asset should be performed based at least in part upon the network performance and whether the electronic device is being powered by the battery or the external power source; and
   when the upgrade of the locally stored digital asset should be performed:
      requesting, by the electronic device, a high quality version of the digital asset from a remote cloud storage;
      receiving, by the electronic device, the high quality version of the digital asset; and
      storing the high quality version of the digital asset in the local storage.

2. The method of claim 1, comprising:
  determining, by the electronic device, whether the upgrade of the locally stored digital asset should be performed based at least in part upon one or more additional criteria, the one or more additional criteria including whether the electronic device is idle, whether the electronic device is in a locked mode, and whether a user of the electronic device has not interacted with the electronic device for a predetermined period of time.

3. The method of claim 2, wherein the one or more additional criteria are waived when:
  the user of the electronic device is seeking to access a particular digital asset previously stored as its low quality version and has not yet be upgraded; or
  the network performance available to the electronic device reaches a predetermined level.

4. The method of claim 1, wherein the digital asset comprises a video file, an audio file, or an image file.

5. The method of claim 1, further comprising:
  determining, by the electronic device, the network performance based on a network bandwidth available to the electronic device as indicated by a network connection type.

6. The method of claim 1, comprising:
  determining, by the electronic device, during performing of the upgrade, whether the performed upgrade should be downgraded; and
  when the performed upgrade should be downgraded, performing a downgrade, by:
    switching back to the low quality version of the digital asset, without further receiving, by the electronic device, of the high quality version of the digital asset.

7. The method of claim 1, comprising:
  receiving, by querying a database, an indication of a storage location other than a location of the remote cloud storage where the high quality version of the digital asset is stored; and
  in response to receiving the indication:
    requesting, by the electronic device, the high quality version of the digital asset from the storage location in lieu of the location of the remote cloud storage; and
    receiving, by the electronic device, the high quality version of the digital asset from the storage location in lieu of the remote cloud storage.

8. The method of claim 1, wherein the digital asset comprises a chunk of data less than an entirety of a piece of digital media.

9. The method of claim 1, comprising deleting, by the electronic device, the low quality version of the digital asset after storing the high quality version of the digital asset in the local storage.

10. A non-transitory computer-readable medium including one or more computer-readable instructions that, when executed by one or more processors, causes the one or more processors to:
  identify a low quality version of a digital asset that is locally stored in local storage;
  determine network performance available to an electronic device comprising the one or more processors;
  determine whether an upgrade of the locally stored digital asset should be performed based at least in part upon the network performance and whether a battery of the electronic device is charging; and
  when the upgrade of the locally stored digital asset should be performed:
    request a high quality version of the digital asset from a remote cloud storage;
    receive the high quality version of the digital asset from the remote cloud storage; and
    store the high quality version of the digital asset in the local storage.

11. The computer-readable medium of claim 10, wherein the computer-readable instructions comprise instructions that cause the one or more processors to:
  determine whether the upgrade of the locally stored digital asset should be performed based at least in part upon one or more additional criteria;
  wherein the one or more additional criteria includes whether the electronic device is idle, whether the electronic device is in a locked mode, and whether a user of the electronic device has not interacted with the electronic device for a predetermined period of time.

12. The computer-readable medium of claim 11, wherein the computer-readable instructions comprise instructions that cause the one or more processors to:
  waive the one or more additional criteria when the user of the electronic device is seeking to access a particular digital asset previously stored as its low quality version and has not yet be upgraded.

13. The computer-readable medium of claim 11, wherein the computer-readable instructions comprise instructions that cause the one or more processors to:
  waive the one or more additional criteria when the determined network performance available to the electronic device reaches a predetermined level.

14. The computer-readable medium of claim 10, wherein the computer-readable instructions comprise instructions that cause the one or more processors to:
  determine the network performance based on a network bandwidth available, as indicated by a network connection type.

15. A non-transitory computer-readable medium, comprising computer-readable instructions that, when executed by one or more processors, causes the one or more processors to:
  receive a request for a particular higher quality version of a lower quality version of a digital asset from an electronic device that locally stores the lower quality version of the digital asset, wherein the particular higher quality version is selected by the electronic device based upon network performance available to the electronic device and whether a battery of the electronic device is charging; and
  upon receiving the request:
    request the particular higher quality version from a cloud storage system;
    receive the particular higher quality version from the cloud storage system; and
    provide the particular higher quality version to the electronic device for storage at the electronic device.

16. The computer-readable medium of claim 15, wherein the computer-readable instructions comprise instructions that cause the one or more processors to:
  receive, from the electronic device, a request for a downgraded version of the particular higher quality version, after the electronic device determines that the particular higher quality version should be downgraded; and
  upon receiving the request for the downgraded version:

retrieve the downgraded version from the cloud storage; and provide the downgraded version to the electronic device.

17. The computer-readable medium of claim 16, wherein the request for the downgraded version is received after the electronic device detects a stall in playback of the higher quality version.

18. The computer-readable medium of claim 15, wherein the computer-readable instructions comprise instructions that cause the one or more processors to:

authenticate the electronic device, a user associated with the electronic device, or both for access to the particular higher quality version; and request the high quality version only upon the electronic device, the user, or both being authenticated.

19. The computer-readable medium of claim 15, wherein the request for the particular higher quality version is received in response to playback of the lower quality version by the electronic device.

20. The computer-readable medium of claim 15, comprising instructions that cause the one or more processors to:

provide the particular higher quality version to the electronic device as a stream of chunks that are less than an entirety of the higher quality version.

* * * * *